United States Patent
Garnica

(10) Patent No.: US 12,060,129 B2
(45) Date of Patent: Aug. 13, 2024

(54) MULTIPLE PROTOCOL COMPATIBLE BICYCLE COMPONENT PAIRING

(71) Applicant: SRAM, LLC, Chicago, IL (US)

(72) Inventor: Jaime Garnica, Skokie, IL (US)

(73) Assignee: SRAM, LLC, Chicago, IL (US)

( * ) Notice: Subject to any disclaimer, the term of this patent is extended or adjusted under 35 U.S.C. 154(b) by 291 days.

(21) Appl. No.: 17/499,568

(22) Filed: Oct. 12, 2021

(65) Prior Publication Data

US 2023/0109945 A1    Apr. 13, 2023

(51) Int. Cl.
| | |
|---|---|
| *B62J 45/20* | (2020.01) |
| *B62J 50/20* | (2020.01) |
| *B62M 25/08* | (2006.01) |
| *H04W 4/06* | (2009.01) |
| *H04W 4/40* | (2018.01) |
| *H04W 76/10* | (2018.01) |

(52) U.S. Cl.
CPC ............... *B62J 45/20* (2020.02); *B62J 50/20* (2020.02); *B62M 25/08* (2013.01); *H04W 4/06* (2013.01); *H04W 4/40* (2018.02); *H04W 76/10* (2018.02)

(58) Field of Classification Search
CPC ......... H04W 4/06; H04W 4/40; H04W 76/10; B62J 45/20; B62J 50/20; B62M 25/08
See application file for complete search history.

(56) References Cited

U.S. PATENT DOCUMENTS

| | | |
|---|---|---|
| 8,655,548 B2 | 2/2014 | Ichida et al. |
| 9,229,712 B2 | 1/2016 | Takamoto et al. |
| 9,491,788 B1 | 11/2016 | Kasai |
| 11,565,766 B2* | 1/2023 | Kosaka .................. B62M 25/08 |
| 2011/0320093 A1* | 12/2011 | Kitamura ............... B62M 25/08 |
| | | 701/1 |
| 2016/0152302 A1 | 6/2016 | Nishino |
| 2016/0257370 A1 | 9/2016 | Hashimoto et al. |
| 2017/0008465 A1 | 1/2017 | Kasai |
| 2017/0029057 A1 | 2/2017 | Kato |
| 2017/0043828 A1 | 2/2017 | Mohamed |
| 2019/0002053 A1 | 1/2019 | Kakinoki |

(Continued)

FOREIGN PATENT DOCUMENTS

| | | |
|---|---|---|
| CN | 1524762 A | 9/2004 |
| CN | 103723238 A | 4/2014 |
| CN | 106256678 A | 12/2016 |

(Continued)

*Primary Examiner* — Tuan H Nguyen

(57) ABSTRACT

An electronic bicycle component includes a memory configured to store a first communication protocol and a second communication protocol, and a processor. The processor is configured, within a pairing session, to generate one or more first messages based on the first communication protocol, broadcast the one or more first messages, and identify whether a first response is received from another electronic bicycle component within a predetermined time period. The predetermined time period is after the broadcast of a first message of the one or more first messages. The response is a response to the broadcast one or more first messages. When, based on the identification, the response is not received within the predetermined time period, the processor is further configured to generate one or more second messages based on the second communication protocol, and broadcast the one or more second messages.

19 Claims, 11 Drawing Sheets

(56) References Cited

U.S. PATENT DOCUMENTS

2019/0246437 A1    8/2019   Chuang

FOREIGN PATENT DOCUMENTS

| | | |
|---|---|---|
| CN | 106394801 A | 2/2017 |
| CN | 106467159 A | 3/2017 |
| CN | 107600250 A | 1/2018 |
| CN | 108284912 A | 7/2018 |
| CN | 207985025 U | 10/2018 |
| EP | 2719616 A2 | 4/2014 |
| KR | 2020078035 A | 7/2020 |
| TW | 201138374 A | 11/2011 |
| TW | 201700335 | 1/2017 |
| TW | 202114461 | 4/2021 |

* cited by examiner

MULTIPLE PROTOCOL COMPATIBLE BICYCLE COMPONENT PAIRING

BACKGROUND

1. Field of the Disclosure

The present disclosure is generally directed to control of bicycle components, and more particularly, to a bicycle component that is pairable with other bicycle components running different communication protocols for such control.

2. Description of Related Art

For bicycle electronic shifting systems, electronic bicycle systems, bicycle suspension systems, and electronic seat post systems, one or more electronic control devices are placed on the bicycle handlebar and/or another rider accessible location on the bicycle or elsewhere. Each of the one or more electronic control devices is paired with one or more respective operation-enacting devices (e.g., a rear derailleur and/or a seat post assembly) to enable communication therebetween and allow control by the respective electronic control device.

For successive generations of an electronic control device, for example, compatibility may be broken, such that electronic control devices of different generations are not interoperable. In other words, electronic control devices of different generations may define different communication protocols within firmware, respectively, such that a newer generation device (e.g., electronic control device) may not be pairable with an older generation device (e.g., an operation-enacting device such as a rear derailleur). In a scenario where there is incompatibility, the newer generation device may be made compatible with the older generation device by loading firmware defining a compatible communication protocol on the newer generation device.

SUMMARY

In one example, an electronic bicycle component for a bicycle includes a communication interface configured to communicate wirelessly with another electronic bicycle component. The electronic bicycle component also includes a memory configured to store a first communication protocol and a second communication protocol. The electronic bicycle component includes a processor in communication with the communication interface and the memory. The processor is configured, within a pairing session establishable by the processor or the other electronic bicycle component, to generate one or more first messages based on the stored first communication protocol. The processor is further configured, within the pairing session, to broadcast, via the communication interface, the one or more first messages and identify whether the communication interface receives a response from the other electronic bicycle component within a predetermined time period. The predetermined time period is after the broadcast of a first message of the one or more first messages. The response is a response to the broadcast one or more first messages. When, based on the identification, the communication interface does not receive the response within the predetermined time period, the processor is further configured to generate one or more second messages based on the stored second communication protocol and broadcast, via the communication interface, the one or more second messages.

In one example, the processor is further configured to establish a wireless network when, based on the identification, the communication interface receives the first response within the predetermined time period. The wireless network enables communication between the electronic bicycle component and the other electronic bicycle component according to the first communication protocol.

In one example, the predetermined time period is a first predetermined time period, the response is a first response, and the wireless network is a first wireless network. When the communication interface does not receive the first response within the first predetermined time period, the processor is further configured to identify whether the communication interface receives a second response from the other electronic bicycle component within a second predetermined time period. The second predetermined time period is after the broadcast of a second message of the one or more second messages. The second response is a response to the broadcast one or more second messages. When the communication interface does not receive the first response within the first predetermined time period, the processor is further configured to establish a second wireless network when, based on the identification of whether the communication interface receives the second response within the second predetermined time period, the communication interface receives the second response within the second predetermined time period. The second wireless network enables communication between the electronic bicycle component and the other electronic bicycle component according to the second communication protocol.

In one example, the establishment of the first wireless network includes identification of first configuration details based on the first communication protocol, and the establishment of the second wireless network includes identification of second configuration details based on the second communication protocol.

In one example, the first configuration details and the second configuration details specify different radio settings, messages exchanged, a sequence of the messages exchanged, or any combination thereof, respectively.

In one example, the processor is further configured to exit the pairing session when the communication interface does not receive the second response within the second predetermined time period.

In one example, the first predetermined time period and the second predetermined time period are the same.

In one example, when the communication interface does not receive the second response within the second predetermined time period, the processor is further configured to identify a duration of the pairing session, compare the duration of the pairing session to a third predetermined time period, and when, based on the comparison, the duration of the pairing session is less than the third predetermined time period, repeat at least the generation of the one or more first messages, the broadcast of the one or more first messages, and the establishment of the first wireless network when the communication interface receives the first response within the first predetermined time period.

In one example, the third predetermined time period is at least twice as long as a sum of the first predetermined time period and the second predetermined time period.

In one example, when the second wireless network is established, the processor is further configured to generate historical communication protocol data identifying the second communication protocol as a most recently used communication protocol between the electronic bicycle component and the other electronic bicycle component.

In one example, the pairing session is a first pairing session. The memory or another memory of the bicycle is further configured to store the historical communication protocol data. The processor is further configured, within a second pairing session establishable by the processor or the other electronic bicycle component after the first pairing session, to generate the one or more second messages before the generation of the one or more first messages based on the stored historical communication protocol data.

In one example, the electronic bicycle component is a control device of the bicycle.

In one example, the electronic bicycle component further includes an input device. The processor is further configured to enter the pairing session in response to user input via the input device.

In one example, the other electric bicycle component is a rear derailleur.

In one example, a system for a bicycle includes a first electronic bicycle component. The first electronic bicycle component includes a first communication interface configured to communicate wirelessly with a second electronic bicycle component, a first memory configured to store a first communication protocol and a second communication protocol, and a first processor in communication with the first communication interface and the first memory. The first processor is configured, within a pairing session establishable by the first electronic bicycle component or the second electronic bicycle component, to generate one or more first messages based on one communication protocol of the first communication protocol and the second communication protocol stored in the first memory, and broadcast, via the first communication interface, the one or more first messages. The second electronic bicycle component includes a second communication interface configured to communicate wirelessly with the first electronic bicycle component, a second memory configured to store a communication protocol, and a second processor in communication with the second communication interface and the second memory. The communication protocol stored in the second memory is the first communication protocol or the second communication protocol. The second processor is configured, within the pairing session, to generate and transmit, via the second communication interface, a response to the broadcast one or more first messages according to the one communication protocol when the communication protocol stored in the second memory matches the one communication protocol, based on which the one or more messages are generated.

In one example, the first processor is further configured to establish a wireless network when the communication interface receives the response within a predetermined time period. The wireless network enables communication between the first electronic bicycle component and the second electronic bicycle component according to the one communication protocol.

In one example, the first processor is further configured, within the pairing session, to generate one or more second messages based on the other stored communication protocol of the first communication protocol and the second communication protocol, and broadcast, via the first communication interface, the one or more second messages when the first communication interface does not receive the response to the broadcast one or more first message within a predetermined time period.

In one example, the predetermined time period is a first predetermined time period. The first processor is further configured to establish a wireless network when the communication interface receives a response to the broadcast one or more second messages according to the other stored communication protocol within a second predetermined time period. The wireless network enables communication between the first electronic bicycle component and the second electronic bicycle component according to the other communication protocol.

In one example, the first electronic bicycle component is a controller device of a bicycle, and the second electronic bicycle component is a rear derailleur of the bicycle.

BRIEF DESCRIPTION OF THE DRAWINGS

Objects, features, and advantages of the present invention will become apparent upon reading the following description in conjunction with the drawing figures, in which.

Other aspects and advantages of the embodiments disclosed herein will become apparent upon consideration of the following detailed description, wherein similar or identical structures have similar reference numerals.

DETAILED DESCRIPTION OF THE DISCLOSURE

Figure 1A:
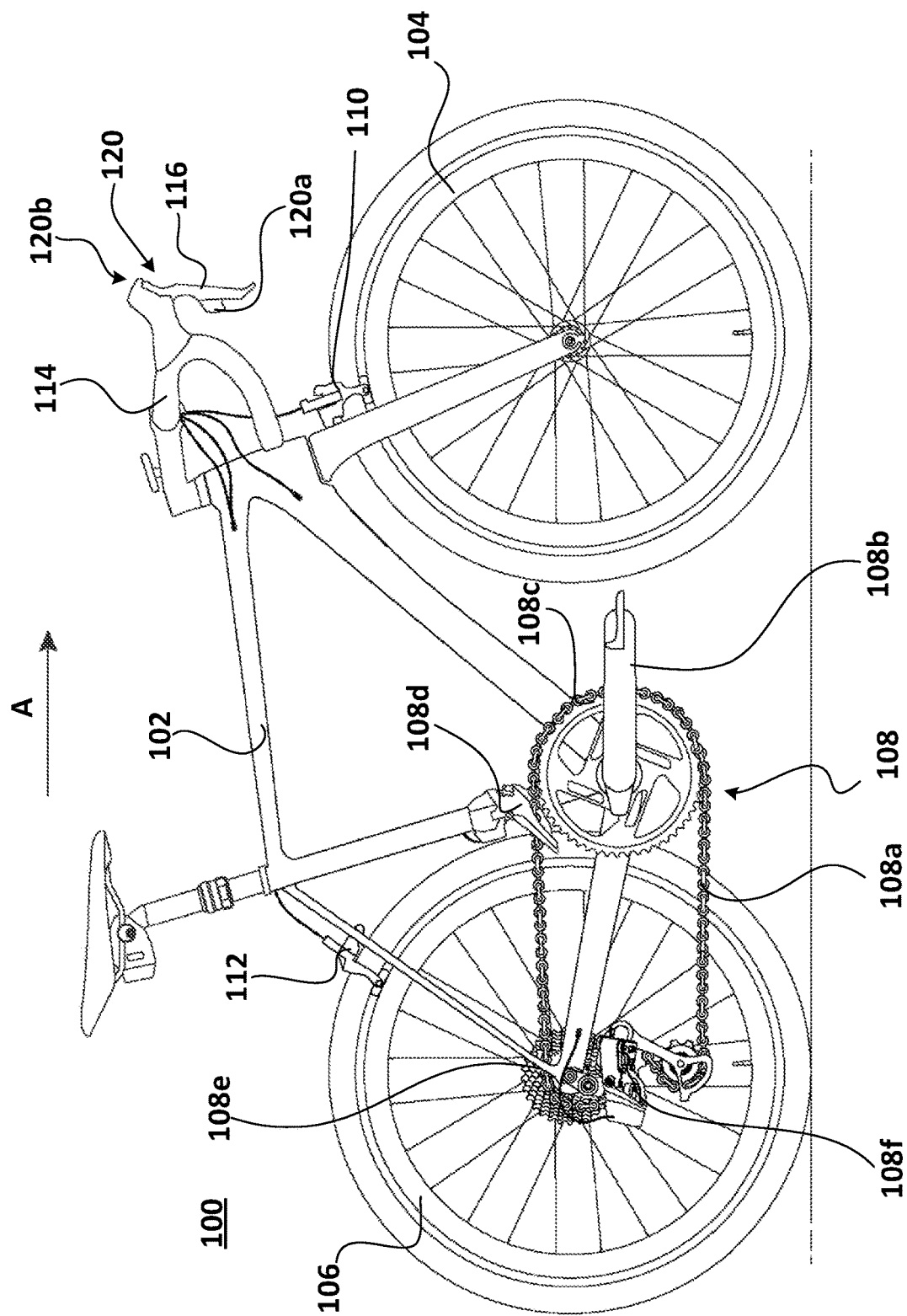
FIG. 1A is a right-side view of an example road bicycle that may implement aspects of the present disclosure.

When a newer generation bicycle component (e.g., an electronic controller device communicating according to a first communication protocol) is made compatible with an older generation bicycle component (e.g., an operation-enacting device communicating according to a second communication protocol) by loading firmware that defines a communication protocol compatible with the older generation bicycle component (e.g., the second communication protocol), the newer generation bicycle component is still only compatible with one generation or the other. For example, the newer generation electronic controller device configured to communicate according to the second communication protocol, as defined within firmware of the electronic controller device, is pairable and may communicate with the older generation operation-enacting device; the electronic controller device, however, may not be pairable or communicate with a newer generation operation-enacting device configured to communicate according to the first communication protocol.

In order to allow a bicycle component (e.g., the electronic controller device) to wirelessly communicate with other bicycle components (e.g., operation-enacting devices) configured to communicate according to different communication protocols, respectively, the bicycle component is configured to switch between the different communication protocols to provide time dependent pairing compatibility for the different communication protocols. In other words, the bicycle component is programmed (e.g., within firmware) with all logic and configuration details for the different communication protocols (e.g., different versions of a communication protocol), and the bicycle component switches between broadcasting different pairing messages generated according to the different communication protocols until a compatible communication protocol is determined or a pairing session times out.

For example, an electronic controller device stores a first communication protocol and a second communication protocol within firmware. The electronic controller device broadcasts, within a pairing session, one or more first messages generated according to the stored first communication protocol. If the electronic controller device receives a response to the one or more first messages from an electronic bicycle component, such as a derailleur, within a first predetermined time period, the electronic controller device establishes a first wireless network that includes the electronic controller device and, for example, the derailleur, according to the first communication protocol. If the electronic controller device does not receive the response from the derailleur, for example, within the first predetermined time period, the electronic controller device transitions to broadcasting one or more second messages generated according to the stored second communication protocol. If the electronic controller device receives a response to the one or more second messages from the derailleur within a second predetermined time period, the electronic controller device establishes a second wireless network, which includes the electronic controller device and the derailleur, according to the second communication protocol. If the electronic controller device does not receive the response from the derailleur, for example, within the second predetermined time period, the electronic controller device exits the pairing session or repeats the acts described above. The electronic controller device may store additional communication protocols and may transition to broadcasting messages generated according to the additional communication protocols, respectively, before exiting the pairing session.

An advantage of the disclosed bicycle component control is that a single bicycle component (e.g., a single electronic controller device) programmed with a single firmware may be used with multiple generations of products running different communication protocols (e.g., different versions of a communication protocol). Another advantage of the disclosed bicycle component control is that this may be accomplished without user intervention. In other words, the single bicycle component may automatically switch between the different communication protocols to determine a compatible communication protocol.

Wireless communication between components is described herein. Although the present specification describes components and functions that may be implemented in particular wireless communication embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In an embodiment, components of the bicycle described herein will communicate with each other. In the case of wireless communication, the components will initially be paired so as to allow secure communication between components on the bicycle without interference from devices not associated with the system. One or more of the components may also be paired with a separate device like a computer, tablet, or phone (e.g., a mobile device). This paired device may provide the user interface to allow the user to communicate with the components on the bicycle. Examples of communication are updating firmware, setting variables, and running diagnostic tools and analysis.

FIG. 1A illustrates a right side view of an example road bicycle 100. The bicycle 100 includes a frame 102, a front wheel 104, a rear wheel 106, and a drivetrain 108. The front wheel 104 and the rear wheel 106 are rotatably coupled to the frame 102. The bicycle 100 includes a front brake 110 for braking the front wheel 104 and a rear brake 112 for braking the rear wheel 106. To allow a user to steer the bicycle 100, the bicycle 100 includes a handlebar assembly 114 attached to the frame 102.

Figure 1B:
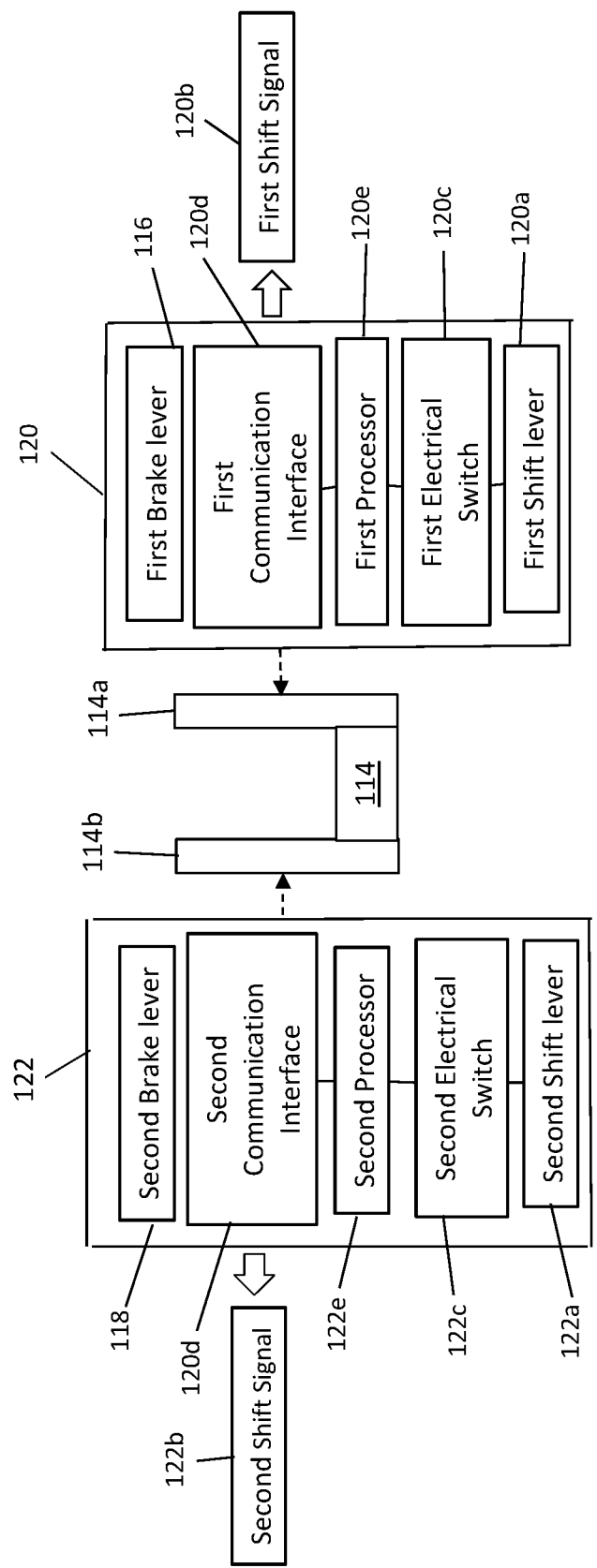
FIG. 1B is a schematic diagram of a handlebar assembly of the example road bicycle shown in FIG. 1A, and other components coupled to the handlebar assembly.

FIG. 1B illustrates a schematic diagram depicting the handlebar assembly 114 and other components coupled to the handlebar assembly 114. As shown in FIG. 1A and/or FIG. 1B, the handlebar assembly 114 includes a right drop bar 114*a* and a left drop bar 114*b* to accommodate the right hand and the left hand of the user, respectively. The bicycle 100 includes a first or right controller device 120 coupled to the right drop bar 114*a*. The first controller device 120 includes a first or right brake lever 116 to allow the user to operate the rear brake 112. Correspondingly, the bicycle 100 includes a second or left controller device 122 coupled to the left drop bar 114*b*. The second controller device 122 includes a second or left brake lever 118 to allow the user to operate the front brake 110.

Figure 1C:
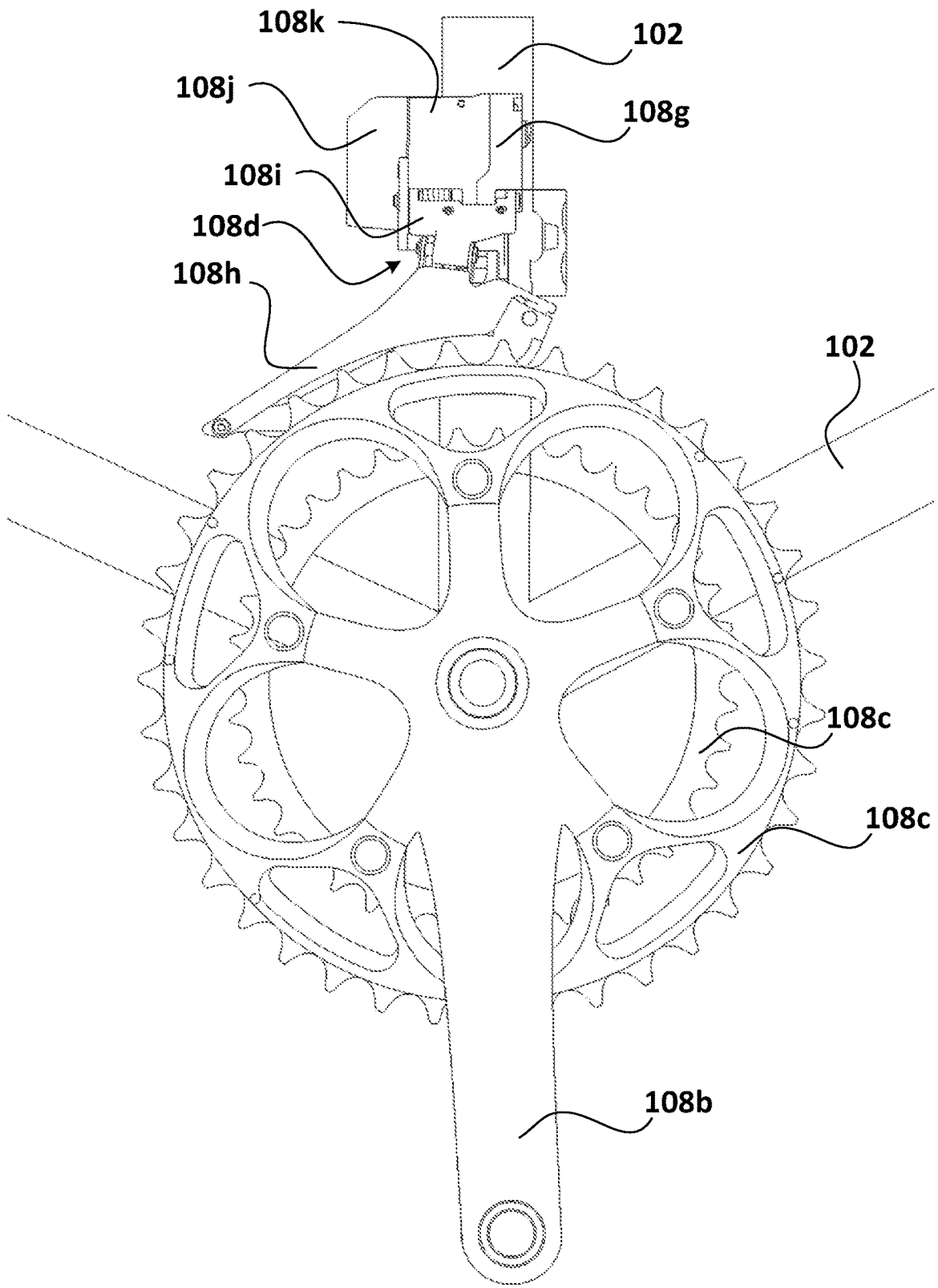
FIG. 1C is a side view of a front derailleur of an example road bicycle.
Figure 1D:
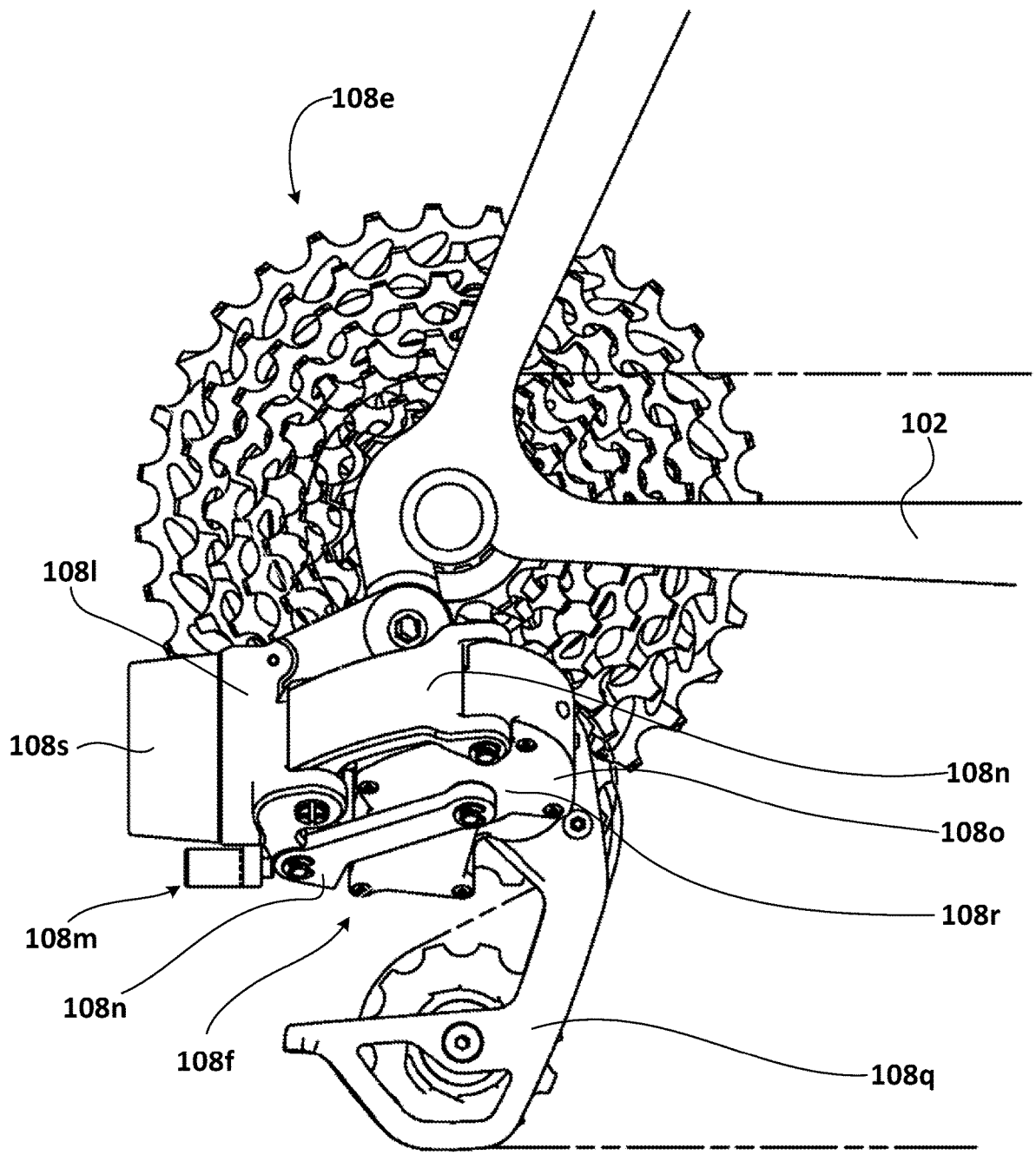
FIG. 1D is a side view of a rear derailleur of the example road bicycle shown in FIG. 1.

As shown in FIGS. 1A, 1C, and 1D, the drivetrain 108 includes a drive chain 108*a*, a front crank 108*b*, one or more front chainrings 108*c*, a front gear changer such as an electromechanical front derailleur 108*d*, rear sprockets 108*e*, and a rear gear changer such as an electromechanical rear derailleur 108*f*. The front chainrings 108*c* are coupled to the front crank 108*b*. Diameters and numbers of teeth on the front sprockets 108*c* may differ from each other. The rear sprockets 108*e* are coaxially mounted to the rear wheel 106. Diameters and numbers of teeth on the rear sprockets 108*e* may decrease from left to right. Alternatively, the diameters and the numbers of teeth on the rear sprockets 108*e* may decrease from right to left. The chain 108*a* engages a selected chainring 108*c* and a selected sprocket 108*e*.

To drive the bicycle 100, the user may pedal to rotate the front crank 108*b* relative to the frame 102. Rotation of the front crank 108*b* causes the selected chainring 108*c* to rotate and the chain 108*a* to move through the drivetrain 108. Movement of the chain 108*a* causes corresponding rotation of the selected sprocket 108*e* and thus the rear wheel 106. Rotation of the rear wheel 106 against the ground may propel the bicycle 100 in a forward direction. The front and/or forward orientation and movement of the bicycle 100 is indicated by the direction of arrow "A." Further, other terms relating to direction may be used herein. For example, the "inboard" and "outboard," and "left" and "right" may be used. The terms "right" and "left," and "inboard" and "outboard" describe a position between parts or items and a vertical plane substantially bisecting the bicycle or a direction toward or away from the vertical plane substantially bisecting the bicycle. Moreover, terms such as "front" and "rear" referred to bicycle mechanisms conventionally mounted to the bicycle and with the bicycle oriented in the forward direction.

The selected chainring 108c and the selected sprocket 108e, in combination, determine a gear ratio for driving the bicycle 100. Operation of the front derailleur 108d allows the user to change the selected chainring 108c engaged by the chain 108a. for example, the front derailleur 108d may be actuated to shift the chain 108a left or right from one chainring 108c to the other. The front derailleur 108d is shown as a wireless electrically actuated front derailleur mounted to the frame 102. The front derailleur 108d may include a base member 108g mounted to the bicycle frame 102 and a chain guide assembly 108h or cage movably connected to the base member 108g by a front linkage 108i in the form of a parallelogram. A front power supply 108j (e.g., a removable battery) may be mounted on the front derailleur 108d. The front power supply 108j may supply power to a front motor unit 108k. The front motor unit 108k is configured to supply torque to the components of the front derailleur 108d to move the chain guide assembly 108h relative to the front base member 108g such that the front derailleur 108d may shift the chain 108a between the front sprockets 108c.

Operation of the rear derailleur 108f allows the user to change the selected sprocket 108e engaged by the chain 108a. For example, the rear derailleur 108f may be actuated to shift the chain 108a left or right from one sprocket 108e to another. The rear derailleur 108f is shown in FIGS. 1A and 1D as a wireless electrically actuated rear derailleur mounted to the frame 102. The rear derailleur may include a base member 108l (e.g., a b-knuckle) that is mounted to the bicycle frame 102. A linkage 108m may include two links 108n that are pivotally connected to the base member 108l. A movable member 108o (e.g., a p-knuckle) may be connected to the linkage 108m. A chain guide assembly 108q or cage may be configured to engage and maintain tension in the chain 108a and may be pivotally connected to a part of the movable member 108o.

A motor unit 108r and rear power supply 108s (e.g., a removable battery) are disposed on the rear derailleur 108f. The battery 108s supplies power to the motor unit 108r. In this embodiment, the motor unit 108r is disposed in the movable member 108o. Alternatively, the motor unit 108r may be disposed in one of the links 108n or in the base member 108l. The motor unit 108r may include a motor and a gear transmission. The motor unit 108r may be coupled with the linkage 108m to laterally move the cage 108q and thus shift the chain 108a among the rear sprockets 108e.

Figure 1E:
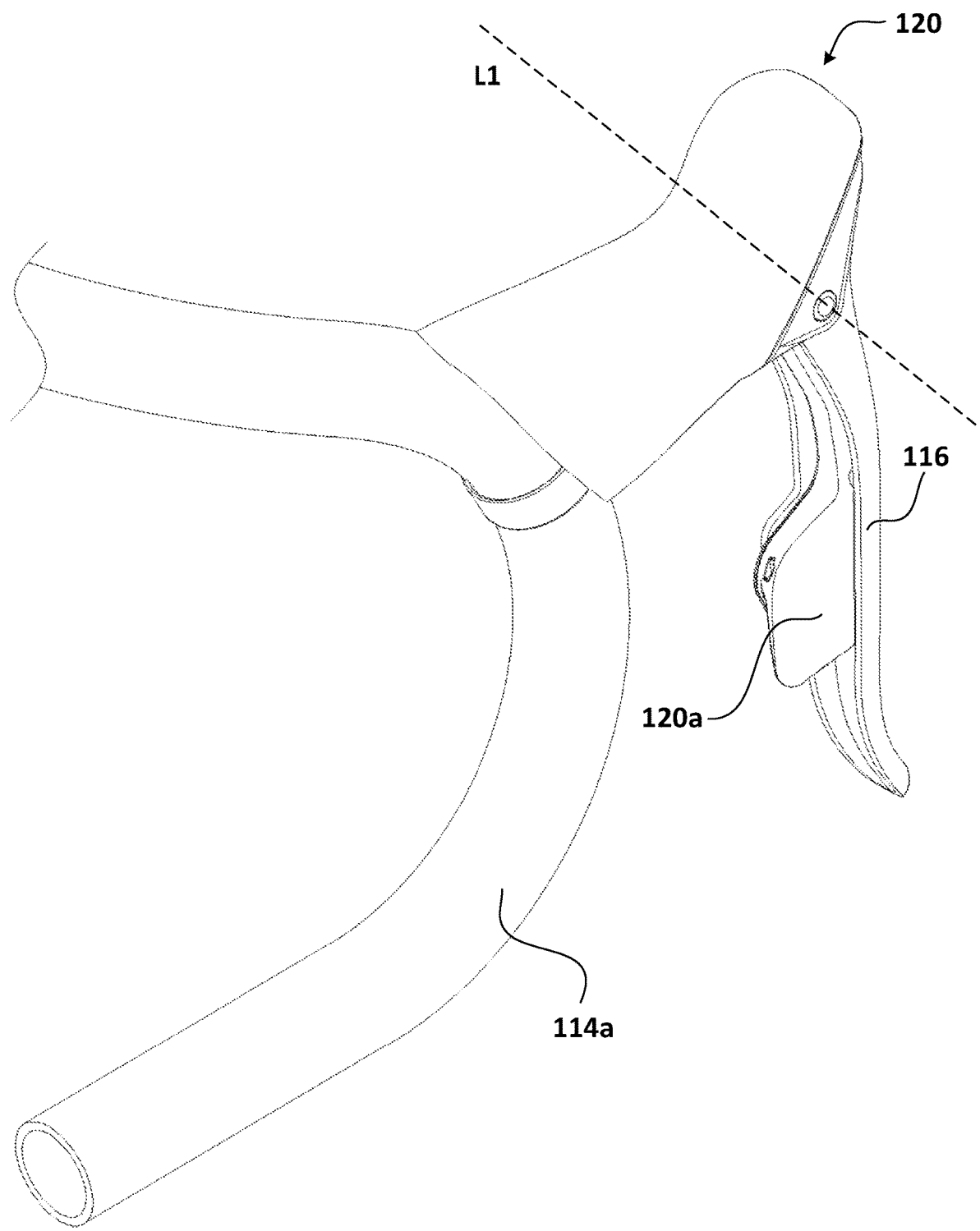
FIG. 1E is a side view of a right controller device of the example road bicycle shown in FIG. 1A coupled to a right drop bar.

Looking to FIGS. 1A, 1B, and 1E, to allow the user to operate the front derailleur 108d or the rear derailleur 108f, the first controller device 120 and the second controller device 122 include a first electrical switch 120c and a second electrical switch 122c, respectively. The first electrical switch 120c and the second electrical switch 122c are actuated by a first input element and a second input element, respectively (e.g., the first shift lever 120a and the second shift lever 122a, respectively; actuators). The first shift lever 120a is configured to receive a right input from the right hand of the user and actuate the first electrical switch 120c.

The second shift lever 122a is configured to receive a left input from the left hand of the user and actuate the second electrical switch 122c. The first shift lever 120a may be positioned behind the first brake lever 116, while the second shift lever 122a may be positioned behind the second brake lever 118.

To provide the right input to the first shift lever 120a, the user may manually apply pressure on the right side of the first shift lever 120a. In response, the first shift lever 120a may pivot about a first shift lever axis L1 from an initial rest position to a shift actuation position. The first shift lever 120a may be biased with a spring or the like so that when the manual pressure is no longer applied by the user, the first shift lever 120a returns to the initial rest position. Similarly, to provide the left input to the second shift lever 122a, the user may manually apply pressure on the left side of the second shift lever 122a. In response, the second shift lever 122a may pivot about a second shift lever axis L2 (not shown) from an initial rest position to a shift actuation position. The second shift lever 122a may be biased with a spring or the like so that when the manual pressure is no longer applied by the user, the second shift lever 122a returns to the left starting position.

The first controller device 120 and the second controller device 122 include a first controller processor 120e and a second controller processor 122e, respectively, that electronically process the manual input received by the first shift lever 120a and the second shift lever 122a, respectively. For example, the right input triggers a first controller communication interface 120d to wirelessly send a first signal 120b, and the left input triggers a second controller communication interface 122d to wirelessly send a second signal 122b. Correspondingly, the front derailleur 108d and the rear derailleur 108f include communication interfaces and processors that are configured to receive and electronically process the first signal 120b and/or the second signal 122b to determine a designated response.

In a first scenario, the user provides the right input via the first shift lever 120a but does not provide the left input via the second shift lever 122a. In response, the first controller device 120 sends the first signal 120b, while the left controller device 122 sends no signal. When the rear derailleur 108f receives the first signal 120b with no second signal 122b, the rear derailleur 108f shifts the chain 108a to engage the next smaller sprocket 108e to the right or performs a downshift. Meanwhile, when the front derailleur 108d receives the first signal 120b with no second signal 122b, the front derailleur 108d remains idle.

In a second scenario, the user provides the left input via the second shift lever 122a but does not provide the right input via the right shift lever 120a. In response, the second controller device 122 sends the second signal 122b, while the first controller device 120 sends no signal. When the rear derailleur 108f receives the second signal 122b with no first signal 120b, the rear derailleur 108f shifts the chain 108a to engage the next larger sprocket 108e to the left or performs a upshift. Meanwhile, when the front derailleur 108d receives the second signal 122b with no second shift signal 120b, the front derailleur 108d remains idle.

In some embodiments, the user may manually apply pressure to the first shift lever 120a and/or the second shift lever 122a for varying amounts of time. For example, without applying pressure to the second shift lever 122a, the user may apply continuous pressure to keep the first shift lever 120a in the left final position for a period that exceeds a threshold amount of time, e.g., approximately one second. In response, the first controller device 120 sends the first shift signal 120*b* for a corresponding amount of time, i.e., until the user releases the pressure on the first shift lever 120*a*. When the rear derailleur 108*f* receives the first signal 120*b*, the rear derailleur 108*f* may determine that the first signal 120*b* exceeds a threshold amount of time. In response, rather than merely shifting the chain 108*a* to engage the next sprocket 108*e* to the right, the rear derailleur 108*f* shifts the chain 108*a* repeatedly over multiple sprockets 108*e* to the right until the user releases the pressure on the first shift lever 120*a* and the first signal 120*b* ceases, or until the chain 108*a* reaches the right-most sprocket 108*e*. Alternatively, to shift the chain 108*a* repeatedly over multiple sprockets 108*e* to the left, the user may apply continuous pressure to the left shift lever 122*a* for a period that exceeds the threshold amount of time, or the threshold number of messages received.

As shown in FIGS. 1A and 1B, the first controller device 120 and the second controller device 122 employ the first shift lever 120*a* and the second shift lever 122*a* as respective input elements to generate corresponding wireless signals 120*b*, 122*b* (e.g., including messages and/or message packets) to actuate the front derailleur 108*d* and the rear derailleur 108*f*. Alternative embodiments, however, may include controller devices with different configurations to control a front derailleur and/or a rear derailleur. For example, a bicycle may include aerobars with pushbuttons instead of drop bars with shift levers, where the pushbuttons act as input elements that may be pressed by the user to generate wireless signals that may be received and processed by the front derailleur and the rear derailleur. Also, while some controller devices may be coupled to handlebar assemblies, other controller devices may be coupled to other areas of a bicycle, such as locations throughout the frame. Further, other types of controller devices are contemplated. For example, a unified shifter device may be employed, where the user may press one or more pushbuttons on a mounted box to send signals that control the front derailleur and/or the rear derailleur. Alternatively, a pedal sensor may be employed to receive input from the user via pedaling action by the user, and the front derailleur and/or the rear derailleur may respond to a signal from the pedal sensor (e.g., select gears to maintain a desired cadence or pedal resistance).

Figure 2A:
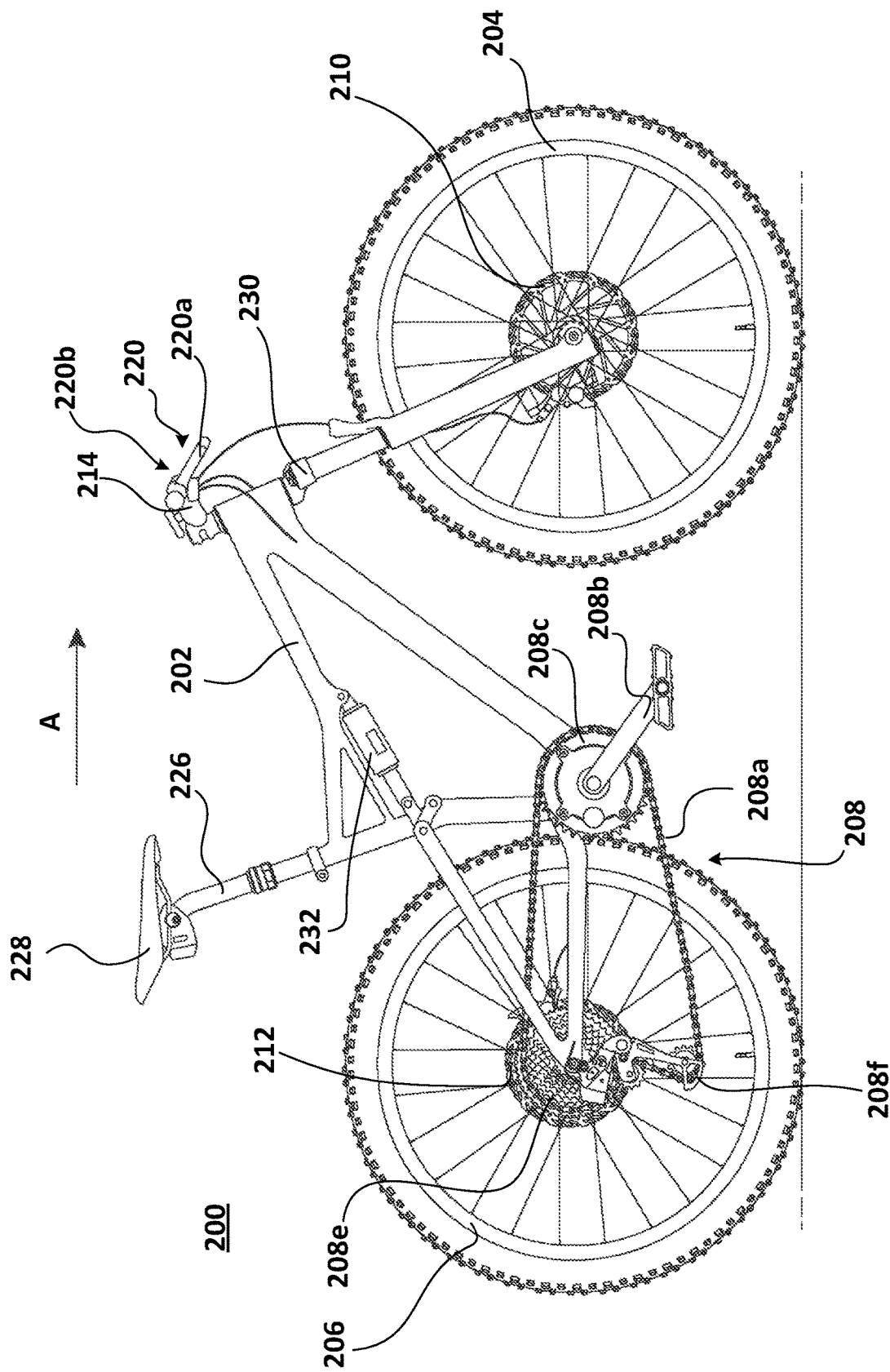
FIG. 2A is a right-side view of an example mountain bicycle that may implement aspects of the present disclosure.

While the example bicycle 100 shown in FIGS. 1A and 1B is a road bicycle, aspects of the present disclosure may be implemented with bicycles of any type. For example, FIG. 2A illustrates a right-side view of an example mountain bicycle 200. In some cases, the bicycle 200 may be an e-bike. The bicycle 200 includes a frame 202, a front wheel 204, a rear wheel 206, a drivetrain 208, front disk brakes 210, and rear disk brakes 212. The drivetrain 208 includes a chain 208*a*, a front crank 208*b*, a front chainring 208*c*, rear sprockets 208*e*, and a rear derailleur 208*f*, which operate in a manner similar to the corresponding components of the drivetrain 108 described above.

In contrast to the bicycle 100, the bicycle 200 includes other operating-enacting devices such as a height-adjustable seat post assembly 226, a front suspension system 230 (e.g., a front suspension assembly), and a rear suspension system 232 (e.g., a rear suspension assembly). In FIGS. 2A and 2C, the seat post assembly 226 is a wireless, electrically actuated seat post assembly 226 that allows a position of a seat 228 (e.g., a saddle) to be dynamically adjusted. For example, the adjustable seat post 226 may include an operable valve (not shown) that allows the seat 228 to be dropped to a lower height during a ride to change the position of the user (e.g., a rider) relative to the frame 202 and achieve better handling. The seat post assembly 226 includes a first or lower tube 226*a* and a second or upper tube 226*b* (e.g., two tubes). The two tubes 226*a*, 226*b* are movable relative to each other to establish a height of the seat 228 relative to the frame 202. A head 226*c* is fixed to a top of the second tube 226*b*. A seat post motor unit 226*d* is mounted to the head 226*c*, and a power supply 226*e* (e.g., a removable battery) is attached to the motor unit 226*d*. The motor unit 226*d* may include a motor and a gear transmission. The seat post power supply 226*e* may supply power to the seat post motor unit 226*d*. The seat post motor unit 226*d* is configured to supply torque to the components of the seat post assembly 226 to open and close the operable valve.

The front suspension system is shown as a wireless, electrically actuated front suspension system 230 that allows the suspension characteristics at the front wheel 204 to be dynamically adjusted. Further, the rear suspension system is shown as a wireless, electrically actuated rear suspension system 232 that allows suspension characteristics at the rear wheel 206 to be dynamically adjusted. The front suspension system 230 and the rear suspension system 232 may further include power supplies such as batteries that supply power to a front suspension motor unit and a rear suspension motor unit, respectively. The front suspension motor unit and the rear suspension motor unit may be configured to supply torque to the components of the front suspension system 230 and the rear suspension system 232, respectively, to open and close one or more valves to change various suspension characteristics.

Figure 2B:
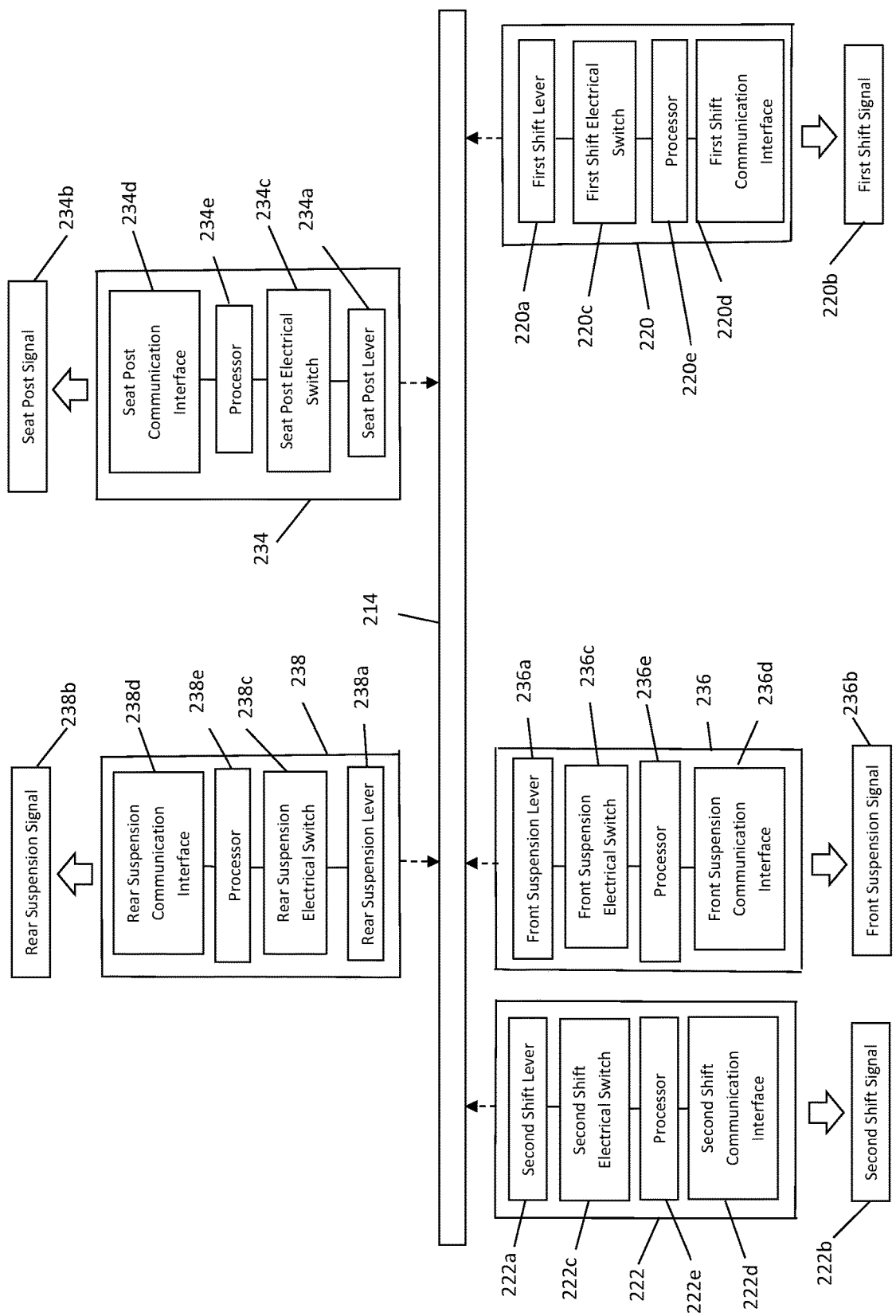
FIG. 2B is a schematic diagram of a handlebar assembly of the example mountain bicycle shown in FIG. 2A, and other components coupled to the handlebar assembly.
Figure 2C:
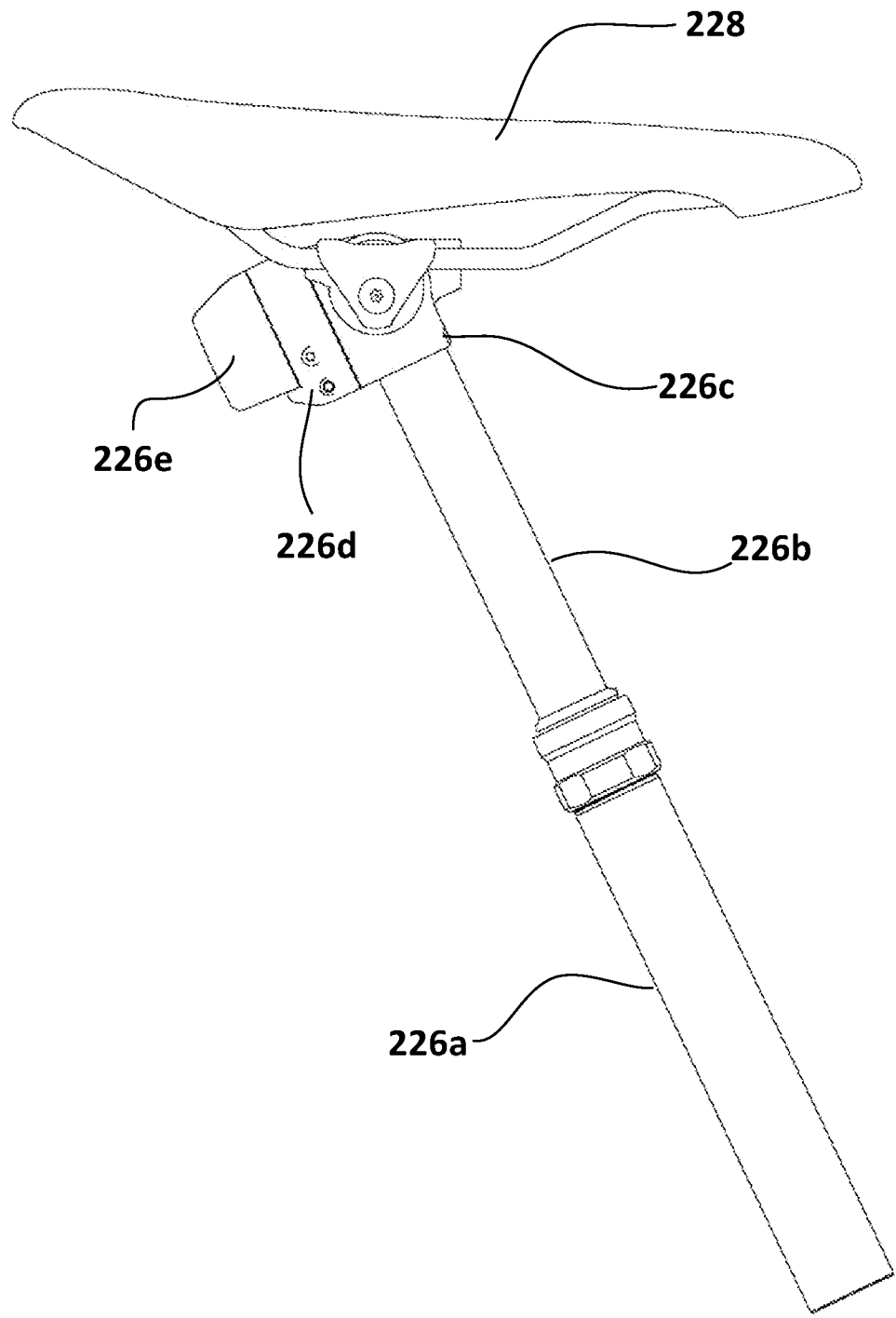
FIG. 2C is a side view of a seat post assembly, with a saddle installed thereon, of the example mountain bicycle shown in FIG. 2A.

Referring to FIGS. 2A and 2B, the bicycle 200 includes a first or right controller device 220 and a second or left controller device 222. The first controller device 220 and the second controller device 222 include a first electrical switch 220*c* and a second electrical switch 222*c*, respectively, that are actuated by a first input element and a second input element, respectively (e.g., a first shift lever or button 220*a* and a second shift lever or button 222*a*, respectively; actuators). The handlebar assembly 214 includes a flat bar or a riser bar instead of drop bars. As such, the first controller device 220 is coupled to a right side of the flat or riser bar, and the second controller device 222 is coupled to a left side of the flat or riser bar. Additionally, the bicycle 200 may include a seat post controller device 234, a front suspension controller device 236, and a rear suspension controller device 238 coupled to the handlebar assembly 214. In other embodiments, one or more of the controller devices (e.g., the first controller device 220 and the seat post controller device 234) may be formed by a single controller device (e.g., a single lever or button).

The user may operate the first shift lever 220*a* and/or the second shift lever 222*a* as described above to generate a first shift signal 220*b* and/or a second shift signal 222*b*, respectively. Similar to the bicycle 100, the first shift signal 220*b* and/or the second shift signal 222*b* may be employed to control the rear derailleur 208*f*. To allow the user to adjust the height of the seat post assembly 226, the seat post controller device 234 includes a seat post electrical switch 234*c* that is actuated by a seat post input element 234*c* such as a lever or button.

To allow the user to adjust the characteristics of the front suspension system 230 and the rear suspension system 232, the front suspension controller device 236 and the rear suspension controller device 238 include a front suspension electrical switch 236*c* and a rear suspension electrical switch 238*c* that are actuated by suspension input elements 236*a*, 238*a*, respectively, such as levers or buttons. Alternatively, the adjustable seat post assembly 226, the adjustable front suspension system 230, and the adjustable rear suspension system 232 may also be configured to receive the first shift signal 220b and/or the second shift signal 222b, so that these devices may also be controlled by operation of the first shift lever 220a and/or the second shift lever 222a.

The seat post controller device 234, the front suspension controller device 236, and the rear suspension controller device 238 include processors 234e, 236e 238e, respectively, that electronically process the manual input received by the seat post input element 234a, the front suspension input element 236a, and the rear suspension input element 238a, respectively. The seat post input triggers a seat post controller communication interface 234d to wirelessly send a seat post signal 234b. The front and rear suspension inputs trigger front and rear controller communication interfaces 236d, 238d, respectively, to wirelessly send a front suspension signal 236b and a rear suspension signal 238b, respectively. Correspondingly, the seat post assembly 226 includes a communication interface and a processor that is configured to receive and electrically process the seat post signal 234b to determine a designated response. The front and rear suspensions include communication interfaces and processors that are configured to receive and electronically process the front suspension signal 236b and the rear suspension signal 238b, respectively, to determine a designated response.

FIGS. 1A-1E and 2A-2C illustrate how various controller devices may be employed to wirelessly communicate control signals to different combinations of operation-enacting devices. The signals from the controller devices may be communicated wirelessly using any technique, protocol, or standard. For instance, Institute of Electrical and Electronics Engineers ("IEEE") 802.11 standards, IEEE 802.15.1 or BLUETOOTH® standards, and/or ANT™ or ANT+™ standards may be used. In some embodiments, however, control signals may be communicated wirelessly over a proprietary protocol, such as one that operates on top of the physical layer of the IEEE 802.15.4 wireless protocol.

The one or more techniques, protocols, or standards, according to which the signals from a controller device are generated, are defined within firmware stored at the controller device. An operation-enacting device may also store firmware that defines a compatible technique, protocol, or standard, such that the operation-enacting device and the controller device may wireless communicate.

Figure 3:
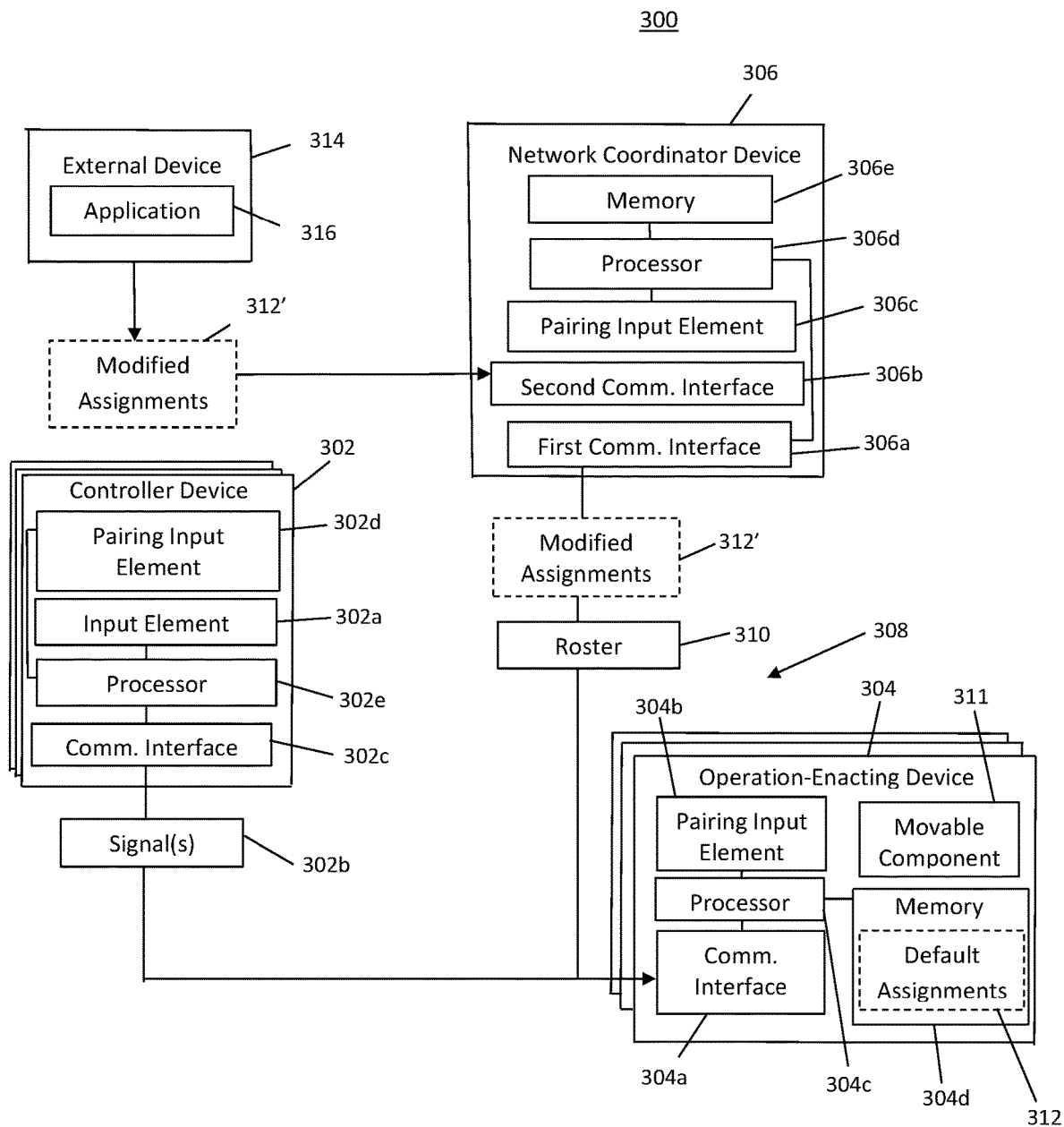
FIG. 3 illustrates an example system for controlling different combinations of operation-enacting devices on a bicycle, according to aspects of the present disclosure.

FIG. 3 illustrates an example system 300 for controlling different combinations of operation-enacting devices on a bicycle. The system 300 includes a plurality of controller devices 302. Each controller device 302 includes at least one respective input element 302a configured to receive input from a user. For example, as described above, the controller devices 302 may include a right controller device and a left controller device coupled to a handlebar assembly, where respective shifter levers act as input elements 302a. In general, input elements 302a may include any variety of shifter, pushbutton, clicker, switch, other toggled device, sensor (e.g., peddling sensor, etc.), or the like. A single controller device 302 may also include more than one input element 302a (e.g., two shifter levers, a plurality of pushbuttons, etc.).

Each controller device of the plurality of controller devices 302 may include one or more additional components. For example, a respective controller device 302 may include a processor 302e, a communications interface 302c, and/or a memory. The plurality of controller devices 302 are configured to transmit to, for example, a plurality of operation-enacting devices 304, signals 302b (e.g., data streams including messages and/or message packets) indicating input received by the input elements 302a of the controller devices 302. For example, the first controller device 120 and the second controller device 122 may wirelessly transmit a first shift signal 120b and a second shift signal 120a as described above to indicate input received by the first shift lever 120a and the second shift lever 122a, respectively. The communications interface 302c may be or include any number of different types of transmitters. For example, the communications interface 302c may be or include a combined transmitter and receiver.

The system 300 also includes the plurality of operation-enacting devices 304, where each operation-enacting device 304 is configured to enact at least one respective operation on the bicycle. For example, the operation-enacting devices 304 may include a front derailleur, a rear derailleur, a height-adjustable seat post assembly, a front suspension system, and/or a rear suspension system, as described above. Each operation-enacting device 304 may include at least one movable component 311 configured to modify an operative state of the bicycle. Each operation-enacting device of the plurality of operation-enacting devices 304 includes a processor 304c and may include a memory 304d.

In some cases, an operation-enacting device 304 may act on more than one component of the bicycle in a single operation. In other cases, a single operation may include more than one act on one or more components of the bicycle. In yet other cases, the operation may include a physical action and a wireless action, where the wireless action sends wireless signals to cause further action by other cooperative device(s).

The system 300 also includes a network coordinator device 306. The network coordinator device 306 includes a first communication interface 306a configured to communicate wirelessly with the controller devices 302 and the plurality of operation-enacting devices 304. Using the first communication interface 306a, the network coordinator device 306 may establish a wireless network 308 that enables communications between the network coordinator device 306, the controller devices 302, and the plurality of operation-enacting devices 304. Correspondingly, each controller device 302 includes a communication interface 302c and each operation-enacting device 304 includes a communication interface 304a for communicating with other devices (e.g., receiving and transmitting data/signals) on the wireless network 308. Each of the communication interfaces 304 may be or include any number of different types of receivers. In one embodiment, each of the communication interfaces 304 is or includes a combined transmitter and receiver. The network coordinator device 306 further includes a processor 306d and may include a memory 306e.

In the embodiment shown in FIG. 3, the network coordinator device 306 further includes a second communication interface 306b configured to communicate wirelessly with an external computing device 314, such as a smart phone, a computing tablet, a laptop, a personal computer, or the like. Using the second communication interface 306b, the network coordinator device 306 may establish a wireless network 308 that enables communications between the network coordinator device 306 and the external computing device 314. The external computing device 314 may include an application 316, such as a mobile application or other computer software.

Although the network coordinator device 306 may appear in FIG. 3 as a separate device, the features of a network coordinator device 306 in alternative embodiments may be provided by one or more of the other controller devices 302 and/or operation-enacting devices 304 such as a rear derailleur.

The processors 302e, 304c, 306d, for example, of the system 300 may include a general processor, digital signal processor, an application specific integrated circuit (ASIC), field programmable gate array (FPGA), analog circuit, digital circuit, combinations thereof, or other now known or later developed processor. The processor may be a single device or combinations of devices, such as through shared or parallel processing.

The memory 304d, 306e, for example, of the system 300 may be any number of different types of memory. For example, such memory may be a volatile memory or a non-volatile memory. The memory may include one or more of a read only memory (ROM), random access memory (RAM), a flash memory, an electronic erasable program read only memory (EEPROM), or other type of memory. The memory may be removable from the corresponding device, such as a secure digital (SD) memory card. Computer memory includes any one or more of a computer-readable medium and other equivalents and successor media, in which data or instructions may be stored. In general, a computer-readable medium includes any medium that is capable of storing, encoding or carrying a set of instructions for execution by a processor or that cause a computer system to perform any one or more of the methods or operations disclosed herein.

To power wireless communications and computer processing, the system 300 may include power supplies, which may be stored internal to the operating device or stored external to the operating device. The power supply may include a combination of multiple batteries or other power providing devices. Specially fitted or configured battery types, or standard battery types such as CR 2012, CR 2016, and/or CR 2032 may be used. In some embodiments, the devices in a system are all individually powered (e.g. by a dedicated battery).

As described above, the embodiments employ communication interfaces (e.g., communication interfaces 302c, 304a, 306a, and 306b). Such communication interfaces are configured to send data such as control signals and/or commands to bicycle components.

The communication interface provides for wireless communications in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustration or other representation of devices, such as the network coordinator devices 306, the controller devices 302, and the operation-enacting devices 304, include (even if not expressly labeled) any combination of processor(s), memory device(s) (e.g., computer-readable media storing program instructions for execution by processor(s)), communication interface(s), and power supply necessary to achieve the disclosed features.

At least some controller devices 302 of the plurality of controller devices 302, at least some operation-enacting devices of the plurality of operation-enacting device 304, and the network coordinator device 306 are paired into the wireless network 308, and a roster 310 is defined by the controller devices 302 and the operation-enacting devices 304 that have been paired to the wireless network 308 at the end of a pairing session. In one embodiment, a first subset of controller devices 302 of the plurality of controller devices 302 and a first subset of operation-enacting devices of the plurality of operation-enacting devices 304 are paired into a first wireless network, and a second subset of controller devices 302 of the plurality of controller devices 302 and a second subset of operation-enacting devices of the plurality of operation-enacting devices 304 are paired into a second wireless network. The first wireless network and the second wireless network operate according to, for example, different communication protocols or different communication protocol versions, respectively. Additional wireless networks may be established according to additional communication protocols or communication protocol versions, respectively, on the bicycle.

By fixing the roster 310, the system 300 only includes the devices 302, 304 selected by the user. The controller devices 302, the operation-enacting devices 304, and the network coordinator device 306 may be paired into the wireless network 308 using pairing input elements 302d, pairing input elements 304b, and pairing input element 306c, respectively. The pairing input elements 302d may be the same as or different than the input elements 302a of the controller devices 302, respectively.

When the pairing session ends, the network coordinator device 306 is configured to transmit, to the operation-enacting devices 304, the roster 310 identifying the controller devices 302 and the operation-enacting devices 304 paired to the wireless network 308. The operation-enacting devices 304 are configured to determine, based on the roster 310 received from the network coordinator device 306, how to enact operations in response to the signals 302b received from the controller devices 302.

The operation-enacting devices 304 are configured to process a default set of assignments 312 based on the roster 310 to determine how the operation-enacting devices 304 enact the operations responsive to the signals 302b. The default set of assignments 312 may be transmitted to each operation-enacting device 304 by the network coordinator device 306, and/or stored locally on each operation-enacting device 304.

For example, after a pairing session is completed, the roster 310 may include a right controller device with a right shift lever, a left controller device with a left shift lever, a front derailleur, and a rear derailleur. The default set of assignments 312 controlling the operation of the operation-enacting devices 304 is determined according to the particular set of devices in the roster 310. For example, the default set of assignments 312 may provide that with the example roster 310 above: (i) the rear derailleur shifts the chain to a sprocket inboard relative to the frame of the bicycle in response to a signal corresponding to a short duration button press from the right controller device (with no signals from the left controller device); (ii) the rear derailleur shifts the chain to a sprocket outboard relative to the frame of the bicycle in response to a signal corresponding to a long duration button press from the right controller device (with no signals from the left controller device); and (iii) the front derailleur shifts the chain to an alternate chainring in response to a signal from the left controller device. If the roster 310 includes a different set of devices, the default set of assignments 312 may be different. For example, if the roster 310 includes a height-adjustable seat post assembly and does not include a front derailleur, the seat post assembly may lower the seat in response to a signal from the left controller device. Other configurations may be provided.

Although the default set of assignments 312 may provide an effective approach for determining how the operation-enacting devices 304 should respond to the signals 302b from the controller devices 302, the user may prefer to use a modified set of assignments 312'. For example, the modified set of assignments 312' may provide that with the example roster 310 above: (i) the rear derailleur shifts the chain to an inboard sprocket relative to the frame of the bicycle in response to signals corresponding to a short button press from the right controller device (without signals from the left controller device); (ii) the front derailleur shifts the chain to an alternate chainring in response to signals corresponding to a long button press from the right controller device (without signals from the left controller device); and (iii) the rear derailleur shifts the chain to the chain to an outboard sprocket relative to the frame of the bicycle in response to signals from the left controller device.

As shown further in FIG. 3, the network coordinator device 306 may include the second wired and/or wireless communication interface 306b configured to receive the modified set of assignments 312', where the modified set of assignments 312' causes at least one operation enacted by an operation-enacting device 304 to occur in response to the signals 302b from a different controller device 302. The second communication interface 306b may employ a different protocol than the first communication interface 306a, particularly if the first communication interface 306a employs a proprietary protocol. The modified set of assignments 312' may be defined by the user within, for example, the mobile application, and transmitted to the operation-enacting devices 304 via the second wired and/or wireless communication interface 306b of the network coordinator device 306.

Figure 4:
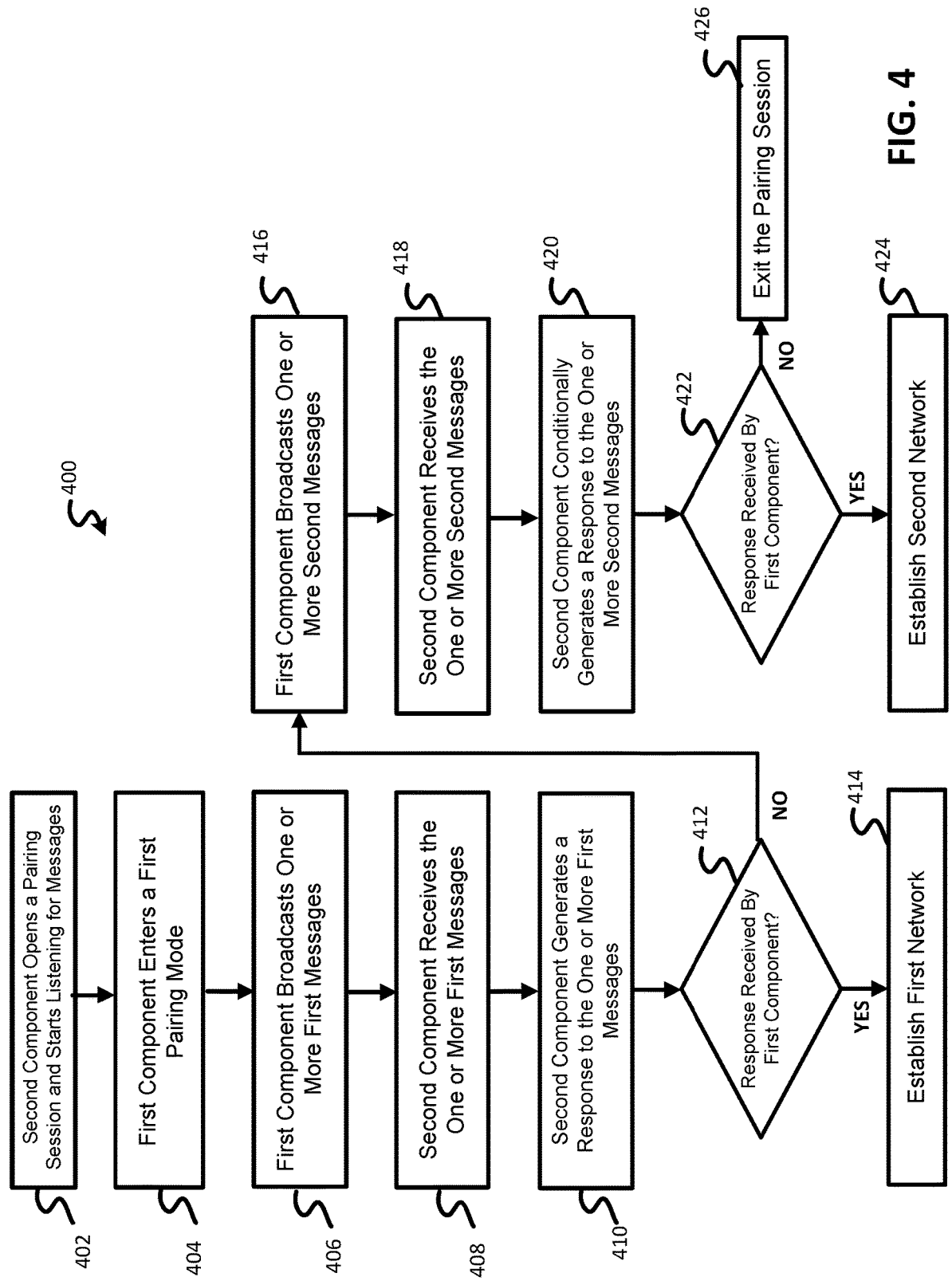
FIG. 4 is a flow chart of an embodiment of a method for pairing electronic bicycle components.

FIG. 4 illustrates a method 400 for paring one or more electronic components (e.g., the operation-enacting devices 304) into a network of a bicycle. For example, the method 400 may be executed to pair a first electronic bicycle component and a second electronic bicycle component into a network of the bicycle. The acts of the method 400 presented below are intended to be illustrative. In some embodiments, the method 400 may be accomplished with one or more additional acts not described, and/or without one or more of the acts discussed. Additionally, the order in which the acts of the method 400 are illustrated in FIG. 4 and described below is not intended to be limiting.

In some embodiments, the method 400 may be implemented in one or more processing device (e.g. digital processor, an analog processor, a digital circuit designed to process information, an analog-circuit designed to process information, a state machine, and/or other mechanisms for electronically processing information). The one or more processing devices include one or more devices executing some or all the acts of the method 400 in response to instructions stored electronically on an electronic storage medium. The one or more processing devices are configured through hardware, firmware, and/or software to be specifically designed for execution of one or more of the acts of the method 400.

As presented in the following, acts may be performed using any combination of the components indicated in FIGS. 1A-1E, 2A-2C, 3, and/or other components. In one embodiment, at least some acts of the method 400 are executed by one or more processing devices of an operation-enacting device (e.g., an operation-enacting device 304 such as a rear derailleur). Alternatively or additionally, at least some acts of the method 400 may be executed by one or more processing devices of a controller device (e.g., a controller device 302).

In act 402, a processor of an electronic bicycle component (e.g., the second electronic bicycle component acting as the network coordinator, or a master or a bridge) opens a pairing session (e.g., a first pairing session). During the pairing session, devices to be paired (e.g., the first electronic device) are identified, authenticated, and secured by exchanging data with a pairing initiator or the network coordinator (e.g., second electronic bicycle component). Data to be exchanged during pairing is defined by a communication protocol (e.g., communication protocol version). The communication protocol may also define properties of a radio frequency (RF) channel used for communication between paired devices.

The processor may open the pairing session in response to a user input at the second electronic bicycle component. For example, the second electronic bicycle component may include an input device (e.g., a button), and the processor of the second electronic bicycle component may open the pairing session in response to the user input at the input device of the second electronic bicycle component. The second electronic bicycle component may open the pairing session in another way, or the first electronic bicycle component may open the pairing session.

In one embodiment, the user is required to press the input device of the second electronic bicycle component for a predetermined amount of time (e.g., one second, five seconds or ten seconds) before the processor of the second electronic bicycle component initiates the pairing session. For example, the input device of the second electronic bicycle component generates a signal and transmits the signal to the processor of the second electronic bicycle component in response to the user interacting (e.g., pressing) the input device. The processor of the second electronic bicycle component receives the signal generated by the input device of the second electronic bicycle component and identifies how long, for example, the input device has been pressed (e.g., a press length) based on the received signal. The processor of the second electronic bicycle component may identify the press length in any number of ways including, for example, within data of messages of the received signal, by counting a number of messages within the received signal, or by the processor counting the press length as the signal is received.

When the second electronic bicycle component opens the pairing session, the processor of the second electronic bicycle component may turn on (e.g., wake) a communication interface (e.g., an antenna) of the second electronic bicycle component. Within the opened pairing session, the communication interface and/or processor of the second electronic bicycle component is listening for and ready to receive messages from the first electronic bicycle component or other electronic bicycle components.

The second electronic bicycle component may be any number of different bicycle components of a bicycle. For example, the second electronic bicycle component may be a derailleur, a seat post assembly, a suspension device or system, an electronic control device (e.g., a shifter or controller device), another electronic bicycle component, or any combination thereof. In one embodiment, the second electronic bicycle component is a rear derailleur of the bicycle.

In act 404, a processor of another electronic bicycle component (e.g., the first electronic bicycle component) enters a first pairing mode in act 402. The processor of the first electronic bicycle component may enter the first pairing mode in response to a user input at the first electronic bicycle component. For example, the first electronic bicycle component may include an input device (e.g., a button), and the processor of the first electronic bicycle component may enter the first pairing mode in response to the user input at the input device of the first electronic bicycle component. The first electronic bicycle component may enter the first pairing mode in other ways.

In one embodiment, the user is required to press the input device of the first electronic bicycle component for a predetermined amount of time (e.g., one second, five seconds, or ten seconds) before the processor of the first electronic bicycle component enters the first pairing mode. For example, the input device of the first electronic bicycle component generates a signal and transmits the signal to the processor of the first electronic bicycle component in response to the user interacting with (e.g., pressing) the input device of the first electronic bicycle component. The processor of the first electronic bicycle component receives the signal generated by the input device of the first electronic bicycle component and identifies how long, for example, the input device has been pressed (e.g., a press length) based on the received signal. The processor of the first electronic bicycle component may identify the press length in any number of ways including, for example, within data of messages of the received signal, by counting a number of messages within the received signal, or by the processor counting the press length as the signal is received.

When the first electronic bicycle component enters the first pairing mode, the processor of the first electronic bicycle component may activate (e.g., wake) a communication interface (e.g., an antenna) of the first electronic bicycle component. Within the entered first pairing mode, the communication interface of the first electronic bicycle component is active and ready to transmit messages wirelessly to the second electronic bicycle component.

The first electronic bicycle component may be any number of different bicycle components of a bicycle. For example, the first electronic bicycle component may be an electronic control device (e.g., a shifter or controller device), a derailleur, a seat post assembly, a suspension device or system, another electronic bicycle component, or any combination thereof. In one embodiment, the first electronic bicycle component is an electronic control device of the bicycle.

In act 406, the processor of the first electronic bicycle component broadcasts (e.g., advertises with no known destination) one or more first messages (e.g., packets) once the first electronic bicycle component enters the first pairing mode in act 404. The processor of the first electronic bicycle component generates the one or more first messages based on a first communication protocol stored in a memory of the first electronic bicycle component. The first communication protocol may define, for example, data content to be exchanged, data format, RF configuration, sequences or timing, other parameters, or any combination thereof. The processor of the first electronic bicycle component broadcasts the one or more first messages via, for example, the communication interface of the first electronic bicycle component.

The memory of the first electronic bicycle component stores two or more communication protocols (e.g., the first communication protocol and a second communication protocol). The two or more communication protocols may be stored within firmware stored in the memory. The two or more communication protocols may be different versions of a communication protocol or may be different communication protocols. For example, the first communication protocol and the second communication protocol are different versions of a communication protocol (e.g., different versions of AIREA™ communication protocol by SRAM LLC of Chicago, Illinois). The first communication protocol and the second communication protocol, for example, may have incompatible requirements for data content and format, RF configuration, message sequence and/or timing, or any combination thereof. The first electronic bicycle component may thus be programmed to have logic and configuration details for multiple versions of a single protocol and/or multiple different protocols.

The second electronic bicycle component includes a memory that stores a communication protocol (e.g., a single communication protocol). For example, the memory of the second electronic bicycle component may store the first communication protocol or the second communication protocol. In one embodiment, the memory of the second electronic bicycle component includes a third communication protocol that is different than any of the two or more communication protocols stored in the first electronic bicycle component (e.g., different than the first communication protocol and the second communication protocol), and the second electronic bicycle component may not be paired with the first electronic bicycle component without updated firmware being loaded to the memory of the first electronic bicycle component.

In act 408, the second electronic bicycle component receives, via the communication interface of the second electronic bicycle component, the one or more first messages generated and broadcast by the first electronic bicycle component in act 406 when the memory of the second electronic bicycle component stores a same communication protocol (e.g., the first communication protocol). In other embodiments, the second electronic bicycle component may not receive the one or more first messages or may only receive a portion of the one or more first messages due to interference and/or the second electronic bicycle component being out of range of the first electronic bicycle component (e.g., when one of the components is not yet installed on the bicycle).

In act 410, the processor of the second electronic bicycle component generates a response to the one or more first messages broadcast in act 406 when the memory of the second electronic bicycle component stores a same communication protocol (e.g., the first communication protocol) as which the first electronic bicycle component used to generate the one or more first messages in act 406. For example, when the memory of the second electronic bicycle component stores the first communication protocol, the processor of the second electronic bicycle component knows how to respond to the one or more first messages generated and broadcast by the first electronic bicycle component according to the first communication protocol in act 406. For example, the stored first communication protocol may identify what data to look for and where to look within the one or more first messages to, for example, identify the one or more first messages as a pairing signal, and may specify data content and format, RF configuration, message sequence and/or timing, or any combination thereof for the response.

The processor of the second electronic bicycle component may not receive the one or more first messages or generate a response to the one or more first messages and/or transmit the response to the first electronic bicycle component when the memory of the second electronic bicycle component stores a different communication protocol (e.g., the second communication protocol) than what was used by the first electronic bicycle component to generate the one or more first messages in act 406. For example, when the memory of the second electronic bicycle component stores the second communication protocol, the processor of the second electronic bicycle component may not know what data to look for and where to look within the one or more first messages, such that the one or more messages are not identified as, for example, a pairing signal.

In act 412, the processor of the first electronic bicycle component identifies whether the first electronic bicycle component (e.g., the communication interface of the first electronic bicycle component) has received the response to the one or more first messages from the second electronic bicycle component within a first predetermined time period. The first predetermined time period may be any number of different time periods including, for example, one second, two seconds, five seconds, ten seconds, twenty seconds, thirty seconds, one minute, or another time period. Other time periods may be provided.

The first predetermined time period may start after a first message of the one or more first messages is broadcast by the first electronic bicycle component. For example, the first predetermined time period may start once the first electronic bicycle component broadcasts the first of the one or more first messages. Alternatively, the first predetermined time period may not start until after all first messages of the one or more first messages have been broadcast by the first electronic bicycle component.

The processor of the first electronic bicycle component may track a time period after the broadcast of at least one of the one or more first messages in any number of ways. For example, the processor of the first electronic bicycle component may include an internal clock that tracks time. The processor of the first electronic bicycle component may identify, based on the internal clock, a time point at which a first message of the one or more messages is broadcast, and may count therefrom at any number of time intervals (e.g., one second). With each increase of the count, the processor of the first electronic bicycle component may compare the count to the first predetermined time period. The processor of the first electronic bicycle component may identify a first timeout when the count is greater than the first predetermined time period. In one embodiment, the processor of the first electronic bicycle component also identifies the first timeout when the count is equal to the first predetermined time period. The count may be reset when the response is received from the second electronic bicycle component. The processor of the first electronic bicycle component may track the time period in alternative or additional ways.

When the processor of the first electronic bicycle component identifies receipt of the response to the one or more first messages prior to timeout, the method 400 moves to act 414. When the processor of the first electronic bicycle component identifies the count is greater than or equal to the first predetermined time period and the response to the one or more first messages has not been received (e.g., identifies the first timeout), the method 400 moves to act 416.

In act 414, the processor of the second electronic bicycle component establishes a first wireless network that includes at least the first electronic bicycle component and the second electronic bicycle component. The first wireless network enables communication (e.g., wireless communication) between at least the first electronic bicycle component and the second electronic bicycle component according to the first communication protocol. The establishment of the first wireless network includes the processor of the first electronic bicycle component identifying configuration details for the first network (e.g., first configuration details) based on the first communication protocol stored in the memory of the first electronic bicycle component. The first configuration details may specify any number of different parameters including, for example, radio settings (e.g., properties of the RF channel), messages exchanged, a sequence of the messages exchanged, other parameters, or any combination thereof. The first configuration details may be used by the processor of the first electronic bicycle component to secure the first wireless network. The processor of the first electronic bicycle component may use the identified first configuration details to determine further behavior of the first electronic bicycle component required to be compatible with other electronic bicycle components that communicate according to the first communication protocol.

In act 416, the processor of the first electronic bicycle component broadcasts one or more second messages (e.g., packets). The processor of the first electronic bicycle component generates the one or more second messages based on the second communication protocol stored in the memory of the first electronic bicycle component. The processor of the first electronic bicycle component transitions, based on the first timeout identified in act 412, from broadcasting the one or more first messages in the first pairing mode to broadcasting the one or more second messages in a second pairing mode. The second communication protocol may define, for example, data content to be exchanged, data format, RF configuration, sequences or timing, other parameters, or any combination thereof. The processor of the first electronic bicycle component broadcasts the one or more second messages via, for example, the communication interface of the first electronic bicycle component.

In act 418, the second electronic bicycle component receives, via the communication interface of the second electronic bicycle component, the one or more second messages generated and broadcast by the first electronic bicycle component in act 416 when the memory of the second electronic bicycle component stores a same communication protocol (e.g. the second communication protocol) as which the first electronic bicycle component used to generate the one or more second messages in act 416. In other embodiments, the second electronic bicycle component may not receive the one or more second messages or may only receive a portion of the one or more second messages due to interference and/or the second electronic bicycle component being out of range of the first electronic bicycle component (e.g., when one of the components is not yet installed on the bicycle).

In act 420, the processor of the second electronic bicycle component generates a response to the one or more second messages broadcast in act 416 when the memory of the second electronic bicycle component stores a same communication protocol (e.g., the second communication protocol) as which the first electronic bicycle component used to generate the one or more second messages in act 416. For example, when the memory of the second electronic bicycle component stores the second communication protocol, the processor of the second electronic bicycle component knows how to respond to the one or more second messages generated and broadcast by the first electronic bicycle component according to the second communication protocol in act 416. For example, the stored second communication protocol may identify what data to look for and where to look within the one or more second messages to, for example, identify the one or more second messages as a pairing signal, and may specify data content and format, RF configuration, message sequence and/or timing, or any combination thereof for the response.

The processor of the second electronic bicycle component may not generate a response to the one or more second messages and/or transmit the response to the first electronic bicycle component when the memory of the second electronic bicycle component stores a different communication protocol (e.g., the first communication protocol) than what was used by the first electronic bicycle component to generate the one or more second messages in act 416. For example, when the memory of the second electronic bicycle component stores the first communication protocol, the processor of the second electronic bicycle component may not know what data to look for and where to look within the one or more second messages, such that the one or more second messages are not identified as, for example, a pairing signal. In one embodiment, when the memory of the second electronic bicycle component stores a different communication protocol than what was used by the first electronic bicycle component to generate the one or more second messages in act 416, the second electronic bicycle component may return an error message to the first electronic bicycle component.

In act 422, the processor of the first electronic bicycle component identifies whether the first electronic bicycle component (e.g., the communication interface of the first electronic bicycle component) has received the response to the one or more second messages from the second electronic bicycle component within a second predetermined time period. The second predetermined time period may be any number of different time periods including, for example, one second, two seconds, five seconds, ten seconds, twenty seconds, thirty seconds, one minute, or another time period. In one embodiment, the second predetermined time period is the same as the first predetermined time period. In other embodiments, the second predetermined time period is different than the first predetermined time period.

The second predetermined time period may start after a second message of the one or more second messages is broadcast by the first electronic bicycle component. For example, the second predetermined time period may start once the first electronic bicycle component broadcasts the first of the one or more second messages. Alternatively, the second predetermined time period may not start until after all second messages of the one or more second messages have been broadcast by the first electronic bicycle component.

The processor of the first electronic bicycle component may track a time period after the broadcast a second message of the one or more second messages in any number of ways. For example, the processor of the first electronic bicycle component may include an internal clock that tracks time. The processor of the first electronic bicycle component may identify, based on the internal clock, a time point at which a second message of the one or more second messages is broadcast, and may count therefrom at any number of time intervals (e.g., one second). With each increase of the count, the processor of the first electronic bicycle component may compare the count to the second predetermined time period. The processor of the first electronic bicycle component may identify a second timeout when the count is greater than the second predetermined time period. In one embodiment, the processor of the first electronic bicycle component also identifies the second timeout when the count is equal to the second predetermined time period. The count may be reset when the response to the one or more second messages is received from the second electronic bicycle component. The processor of the first electronic bicycle component may track the time period in alternative or additional ways.

When the processor of the first electronic bicycle component identifies receipt of the response to the one or more second messages prior to timeout, the method 400 moves to act 424. When the processor of the first electronic bicycle component identifies the count is greater than or equal to the second predetermined time period and the response to the one or more second messages has not been received (e.g., identifies the second timeout), the method 400 moves to act 426.

In act 424, the processor of the second electronic bicycle component establishes a second wireless network that includes at least the first electronic bicycle component and the second electronic bicycle component. The second wireless network enables communication (e.g., wireless communication) between at least the first electronic bicycle component and the second electronic bicycle component according to the second communication protocol. The establishment of the second wireless network includes the processor of the first electronic bicycle component identifying configuration details for the second network (e.g., second configuration details) based on the second communication protocol stored in the memory of the first electronic bicycle component. The second configuration details may specify any number of different parameters including, for example, radio settings (e.g., properties of the RF channel), messages exchanged, a sequence of the messages exchanged, other parameters, or any combination thereof. The second configuration details may be used by the processor of the first electronic bicycle component to secure the second wireless network. The processor of the first electronic bicycle component may also use the identified second configuration details to determine further behavior of the first electronic bicycle component required to be compatible with other electronic bicycle components that communicate according to the second communication protocol.

In act 426, the processor of the first electronic bicycle component exits the pairing session opened in act 402. In the method 400, the first pairing mode and the second pairing mode may each be entered once per pairing session. For example, if the first electronic bicycle component fails to pair with the second electronic bicycle component using the first communication protocol and the second communication protocol in the first pairing mode and the second pairing mode, respectively, the user may retry pairing of the first electronic bicycle component and the second electronic bicycle component using the method 400 by opening another pairing session (e.g., a second pairing session; repeating act 402) and re-entering the first pairing mode of the first electronic bicycle component (e.g., repeating act 404).

The first electronic bicycle component may store more than two communication protocols, and the acts 406-414 may be repeated (e.g., instead of exiting the pairing session at act 426) any number of times for additional communication protocols (e.g., a third communication protocol). Other electronic bicycle components on the bicycle (e.g., other control devices and/or other operation enacting devices) may join the network using the method 400.

Using the method 400, if the second electronic bicycle component operates according to the second communication protocol (e.g., the memory of the second electronic bicycle component stores the second communication protocol) and the first electronic bicycle component first broadcasts the one or more first messages generated according to the first communication protocol, the first electronic bicycle component, and thus the user, will have to wait for the first timeout before pairing may succeed. Depending on a length of the first predetermined time period (e.g., one second), this may be a nuisance to the user.

In one embodiment, when the second electronic bicycle component establishes the second wireless network (see act 424) after the first timeout, the processor of the first electronic bicycle component may store data (e.g., historical communication protocol data) identifying a most recently used communication protocol (e.g., a most recently successful communication protocol; the second communication protocol). For a future pairing session (e.g., a second pairing session), the processor of the first electronic bicycle component may use the stored data identifying the most recently successful communication protocol to determine which stored communication protocol (e.g., the first communication protocol or the second communication protocol), with which to start the method 400. In other words, the processor of the first electronic bicycle component may use the stored data to determine whether to broadcast the one or more first messages or the one or more second messages in the act 406. The user may thus not have to wait for a timeout (e.g., the first timeout) each time the first electronic bicycle component and the second electronic bicycle component are paired according to the second communication protocol. This gives the user a better user experience, assuming the user re-pairs same devices (e.g., the first electronic bicycle component and the second electronic bicycle component) more frequently than new devices.

Figure 5:
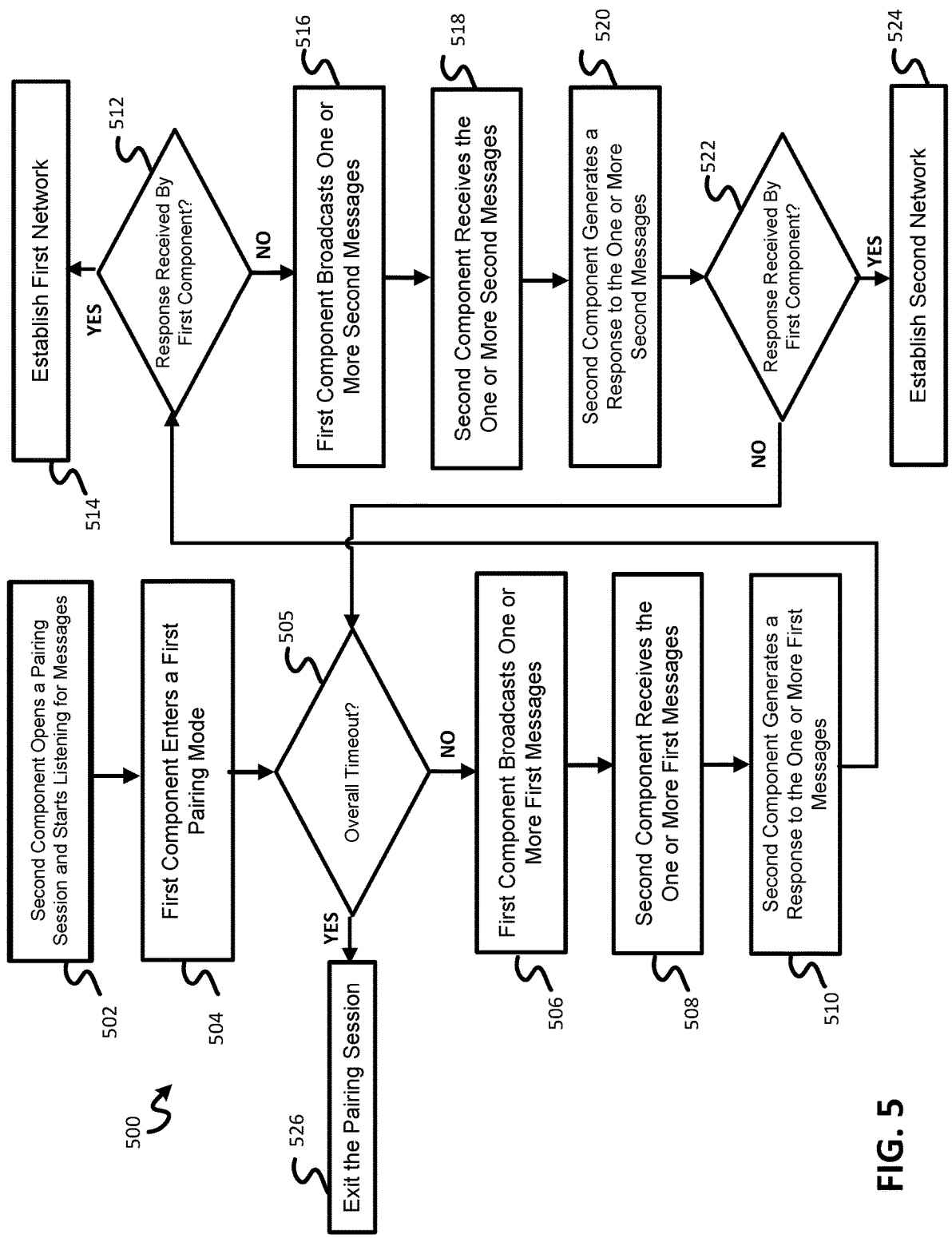
FIG. 5 is a flow chart of another embodiment of a method for pairing electronic bicycle components.

In another embodiment, the pairing mode may change more frequently, such that the first electronic bicycle component, for example, may be in each pairing mode (e.g., the first pairing mode and the second pairing mode) multiple times per pairing session. For example, FIG. 5 illustrates a method 500 for paring one or more electronic components (e.g., the operation-enacting devices 304) into a network of a bicycle. The acts of the method 500 presented below are intended to be illustrative. In some embodiments, the method 500 may be accomplished with one or more additional acts not described, and/or without one or more of the acts discussed. Additionally, the order in which the acts of the method 500 are illustrated in FIG. 5 and described below is not intended to be limiting.

In some embodiments, the method 500 may be implemented in one or more processing devices (e.g. digital processor, an analog processor, a digital circuit designed to process information, an analog-circuit designed to process information, a state machine, and/or other mechanisms for electronically processing information). The one or more processing devices include one or more devices executing some or all the acts of the method 500 in response to instructions stored electronically on an electronic storage medium. The one or more processing devices are configured through hardware, firmware, and/or software to be specifically designed for execution of one or more of the acts of the method 500.

As presented in the following, acts may be performed using any combination of the components indicated in FIGS. 1A-1E, 2A-2C, 3, and/or other components. In one embodiment, at least some acts of the method 500 are executed by one or more processing devices of an operation-enacting device (e.g., an operation-enacting device 304 such as a rear derailleur). Alternatively or additionally, at least some acts of the method 500 may be executed by one or more processing devices of a controller device (e.g., a controller device 302).

Acts 502-526 of the method 500 of FIG. 5 correspond to acts 402-426 of the method 400 of FIG. 4, respectively. The method 500 of FIG. 5 is different than the method 400 of FIG. 4 in that the method 500 moves to act 505 after the processor of, for example, the first electronic bicycle component enters the first pairing mode in act 504.

In act 505, the processor of the first electronic bicycle component determines whether an overall timeout for the pairing session has occurred. For example, after the processor of the second electronic bicycle component opens the pairing session and listening for other components in act 502 or after the processor of the first electronic bicycle component enters the first pairing mode, the processor of the first electronic bicycle component tracks (e.g., counts) an elapsed time for the pairing session. The processor of the first electronic bicycle component compares the elapsed time for the pairing session to a third predetermined time period. When, based on the comparison, the elapsed time for the pairing session is greater than (or equal to) the third predetermined time period, the processor of the first electronic bicycle component identifies the overall timeout, and the method 500 moves to act 526. When, based on the comparison, the elapsed time for the pairing session is less than the third predetermined time period (e.g., overall timeout has not occurred), the method 500 moves to act 506.

In act 522, when the processor of the first electronic bicycle component identifies the first electronic bicycle component (e.g., the communication interface of the first electronic bicycle component) has not received the response to the one or more second messages from the second electronic bicycle component within the second predetermined time period, the method 500 moves back to act 505 (e.g., instead of act 526) to determine whether the overall timeout for the pairing session has occurred.

The first predetermined time period and the second predetermined time period for the method 500 of FIG. 5 may be shorter than the first predetermined time period and the second predetermined time period for the method 400 of FIG. 4, respectively. For example, in the method 500 of FIG. 5, the first predetermined time period and the second predetermined time period may each be between 1 ms and 100 ms, though other time periods may be used. In one embodiment, the third predetermined time period is at least twice as long as a sum of the first predetermined time period and the second predetermined time period. In other words, the acts 506-524 may be repeated at least twice.

In one embodiment, the third predetermined time period used in the method 500 of FIG. 5 is equal to a sum of the first predetermined time period and the second predetermined time period of the method 400 of FIG. 4. For example, the third predetermined time period of the method 500 of FIG. 5 may be 2 s, while the first predetermined time period and the second predetermined time period of the method 400 of FIG. 4 may be 1 s each.

In accordance with various embodiments of the present disclosure, the methods described herein may be implemented with software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The methods and techniques described herein may be implemented using hardware configurations described herein and one or more computer programs providing instructions for the hardware. A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows may also be performed by, and the apparatus may also be implemented as, special purpose logic circuitry (e.g., a field programmable gate array (FPGA) or an application specific integrated circuit (ASIC)).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or is operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant ("PDA"), a mobile audio player, a Global Positioning System ("GPS") receiver, or a system control device to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a system control device is integrated with a mobile telephone, PDA, a mobile audio player, a GPS receiver, and communicates wirelessly with bicycle components to provide automatic mode control.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. An electronic bicycle component for a bicycle, the electronic bicycle component comprising:
    a communication interface configured to communicate wirelessly with another electronic bicycle component;
    a memory configured to store a first communication protocol and a second communication protocol; and
    a processor in communication with the communication interface and the memory, the processor being configured, within a pairing session establishable by the processor or the other electronic bicycle component, to:
        generate one or more first messages based on the first communication protocol;
        broadcast, via the communication interface, the one or more first messages;
        identify whether the communication interface receives a response from the other electronic bicycle component within a predetermined time period, the predetermined time period being after the broadcast of a first message of the one or more first messages, the response being a response to the broadcast of the one or more first messages;
        when, based on the identification, the communication interface does not receive the response within the predetermined time period:
            generate one or more second messages based on the second communication protocol; and
            broadcast, via the communication interface, the one or more second messages.

2. The electronic bicycle component of claim 1, wherein the processor is further configured to establish a wireless network when, based on the identification, the communication interface receives the response within the predetermined time period, the wireless network enabling communication between the electronic bicycle component and the other electronic bicycle component according to the first communication protocol.

3. The electronic bicycle component of claim 2, wherein the predetermined time period is a first predetermined time period, the response is a first response, and the wireless network is a first wireless network, and
    wherein when the communication interface does not receive the first response within the first predetermined time period, the processor is further configured to:
        identify whether the communication interface receives a second response from the other electronic bicycle component within a second predetermined time period, the second predetermined time period being after the broadcast of a second message of the one or more second messages, the second response being a response to the broadcast of the one or more second messages; and
        establish a second wireless network when, based on the identification of whether the communication interface receives the second response within the second predetermined time period, the communication interface receives the second response within the second predetermined time period, the second wireless network enabling communication between the electronic bicycle component and the other electronic bicycle component according to the second communication protocol.

4. The electronic bicycle component of claim 3, wherein the establishment of the first wireless network comprises identification of first configuration details based on the first communication protocol, and the establishment of the second wireless network comprises identification of second configuration details based on the second communication protocol.

5. The electronic bicycle component of claim 4, wherein the first configuration details and the second configuration details specify different radio settings, messages exchanged, a sequence of the messages exchanged, or any combination thereof, respectively.

6. The electronic bicycle component of claim 3, wherein the processor is further configured to exit the pairing session when the communication interface does not receive the second response within the second predetermined time period.

7. The electronic bicycle of claim 3, wherein the first predetermined time period and the second predetermined time period are the same.

8. The electronic bicycle component of claim 3, wherein when the communication interface does not receive the second response within the second predetermined time period, the processor is further configured to:
    identify a duration of the pairing session;
    compare the duration of the pairing session to a third predetermined time period; and
    when, based on the comparison, the duration of the pairing session is less than the third predetermined time period, repeat at least the generation of the one or more first messages, the broadcast of the one or more first messages, and the establishment of the first wireless network when the communication interface receives the first response within the first predetermined time period.

9. The electronic bicycle component of claim 8, wherein the third predetermined time period is at least twice as long as a sum of the first predetermined time period and the second predetermined time period.

10. The electronic bicycle component of claim 3, wherein when the second wireless network is established, the processor is further configured to generate historical communication protocol data identifying the second communication protocol as a most recently used communication protocol between the electronic bicycle component and the other electronic bicycle component.

11. The electronic bicycle component of claim 10, wherein the pairing session is a first pairing session,
- wherein the memory or another memory of the bicycle is further configured to store the historical communication protocol data, and
- wherein the processor is further configured, within a second pairing session establishable by the processor or the other electronic bicycle component after the first pairing session, to generate the one or more second messages before the generation of the one or more first messages based on the stored historical communication protocol data.

12. The electronic bicycle component of claim 1, wherein the electronic bicycle component is a control device of the bicycle.

13. The electronic bicycle component of claim 1, further comprising an input device,
- wherein the processor is further configured to enter the pairing session in response to user input via the input device.

14. The electronic bicycle component of claim 1, wherein the other electric bicycle component is a rear derailleur.

15. A system for a bicycle, the system comprising:
- a first electronic bicycle component comprising:
  - a first communication interface configured to communicate wirelessly with a second electronic bicycle component;
  - a first memory configured to store a first communication protocol and a second communication protocol; and
  - a first processor in communication with the first communication interface and the first memory, the first processor being configured, within a pairing session establishable by the first electronic bicycle component or the second electronic bicycle component, to:
    - generate one or more first messages based on one of the first and second communication protocols stored in the first memory; and
    - broadcast, via the first communication interface, the one or more first messages;
- the second electronic bicycle component comprising:
  - a second communication interface configured to communicate wirelessly with the first electronic bicycle component;
  - a second memory configured to store a single communication protocol, the single communication protocol stored in the second memory being one of the first communication protocol and the second communication protocol; and
  - a second processor in communication with the second communication interface and the second memory, the second processor being configured, within the pairing session, to generate and transmit, via the second communication interface, a response to the broadcast one or more first messages according to the one of first and second communication protocols when the single communication protocol stored in the second memory matches the one of the first and second communication protocols, based on which the one or more first messages are generated.

16. The system of claim 15, wherein the second processor is further configured to establish a wireless network when the first communication interface receives the response within a predetermined time period, the wireless network enabling communication between the first electronic bicycle component and the second electronic bicycle component according to the single communication protocol.

17. The system of claim 15, wherein the first processor is further configured, within the pairing session, to generate one or more second messages based on the other of the first and second communication protocols, and broadcast, via the first communication interface, the one or more second messages when the first communication interface does not receive the response to the broadcast one or more first message within a predetermined time period.

18. The system of claim 17, wherein the predetermined time period is a first predetermined time period, and
- wherein the second processor is further configured to establish a wireless network when the first communication interface receives a response to the broadcast one or more second messages according to the other of the first and second communication protocols within a second predetermined time period, the wireless network enabling communication between the first electronic bicycle component and the second electronic bicycle component according to the other of the first and second communication protocols.

19. The system of claim 15, wherein the first electronic bicycle component is a controller device of a bicycle, and the second electronic bicycle component is a rear derailleur of the bicycle.

* * * * *